(12) United States Patent
Shimizu et al.

(10) Patent No.: US 7,386,213 B2
(45) Date of Patent: Jun. 10, 2008

(54) BIDIRECTIONAL COMMUNICATION OPTICAL WAVEGUIDE AND MANUFACTURING METHOD THEREOF

(75) Inventors: Keishi Shimizu, Kanagawa (JP);
Shigemi Ohtsu, Kanagawa (JP);
Kazutoshi Yatsuda, Kanagawa (JP);
Eiichi Akutsu, Kanagawa (JP); Akira Fujii, Kanagawa (JP); Toshihiko Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 162 days.

(21) Appl. No.: 11/254,093

(22) Filed: Oct. 20, 2005

(65) Prior Publication Data
US 2007/0025671 A1    Feb. 1, 2007

(30) Foreign Application Priority Data

Oct. 29, 2004 (JP) ............................. 2004-317305
Mar. 23, 2005 (JP) ............................. 2005-084917
Mar. 23, 2005 (JP) ............................. 2005-084918
Oct. 14, 2005 (JP) ............................. 2005-300867

(51) Int. Cl.
*G02B 6/10*   (2006.01)

(52) U.S. Cl. ....................................... 385/129; 385/31

(58) Field of Classification Search ................. 385/14, 385/31, 32, 39, 44, 45, 50, 88, 129
See application file for complete search history.

(56) References Cited

U.S. PATENT DOCUMENTS 5,555,127 A * 9/1996 Abdelkader et al. ..... 359/341.1
5,637,264 A * 6/1997 Knapp et al. ............... 264/1.24

FOREIGN PATENT DOCUMENTS

| JP | A-58-191543 | 11/1983 |
| JP | 62258407 A * | 11/1987 |
| JP | A-04-293004 | 10/1992 |
| JP | A-11-271548 | 10/1999 |

OTHER PUBLICATIONS

Translation of Murakami, JP 62-258407-A previously cited.*
Manabu Kagami et al.; "Simple Structural Quasi-Optical Circulator Composed of Tapering and Bending Waveguides", IEICE Transaction C-1; vol. J82-C-I, No. 6; 1999; pp. 349-358. (w/abstract).

* cited by examiner

*Primary Examiner*—Sarah Song
(74) *Attorney, Agent, or Firm*—Oliff & Berridge, PLC

(57) ABSTRACT

The present invention provides a bidirectional communication optical waveguide which can adopt a configuration in which light sources having the same wavelengths are used and stray light is not inputted to either a light emitting device or a light receiving device, and the bidirectional communication optical waveguide realizes a bidirectional communication module. The bidirectional communication optical waveguide includes a main waveguide core and a sub-waveguide core. A main inclined plane is provided in a midway of an optical path in the main waveguide core.

16 Claims, 15 Drawing Sheets

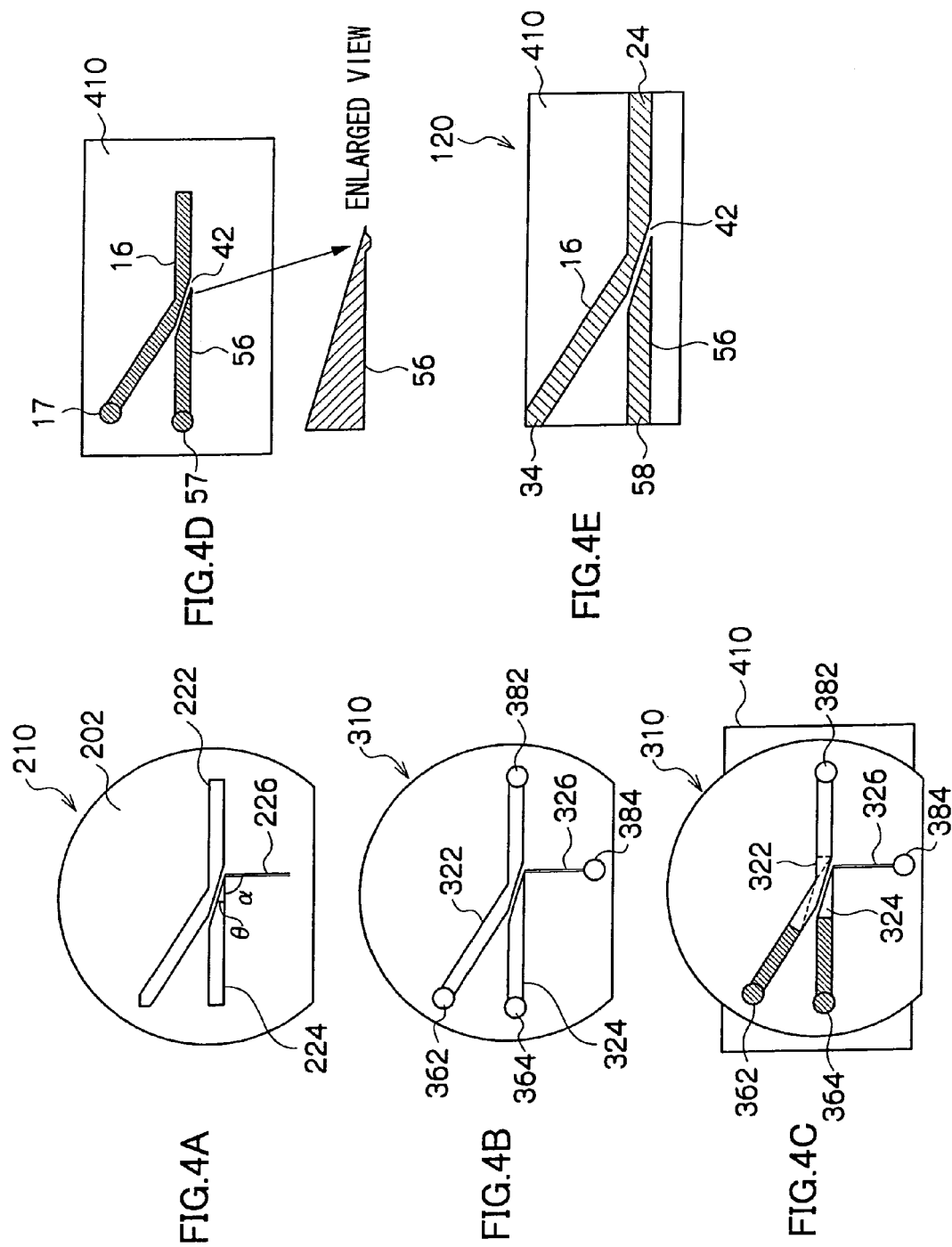

$\theta_2 > \theta_1$

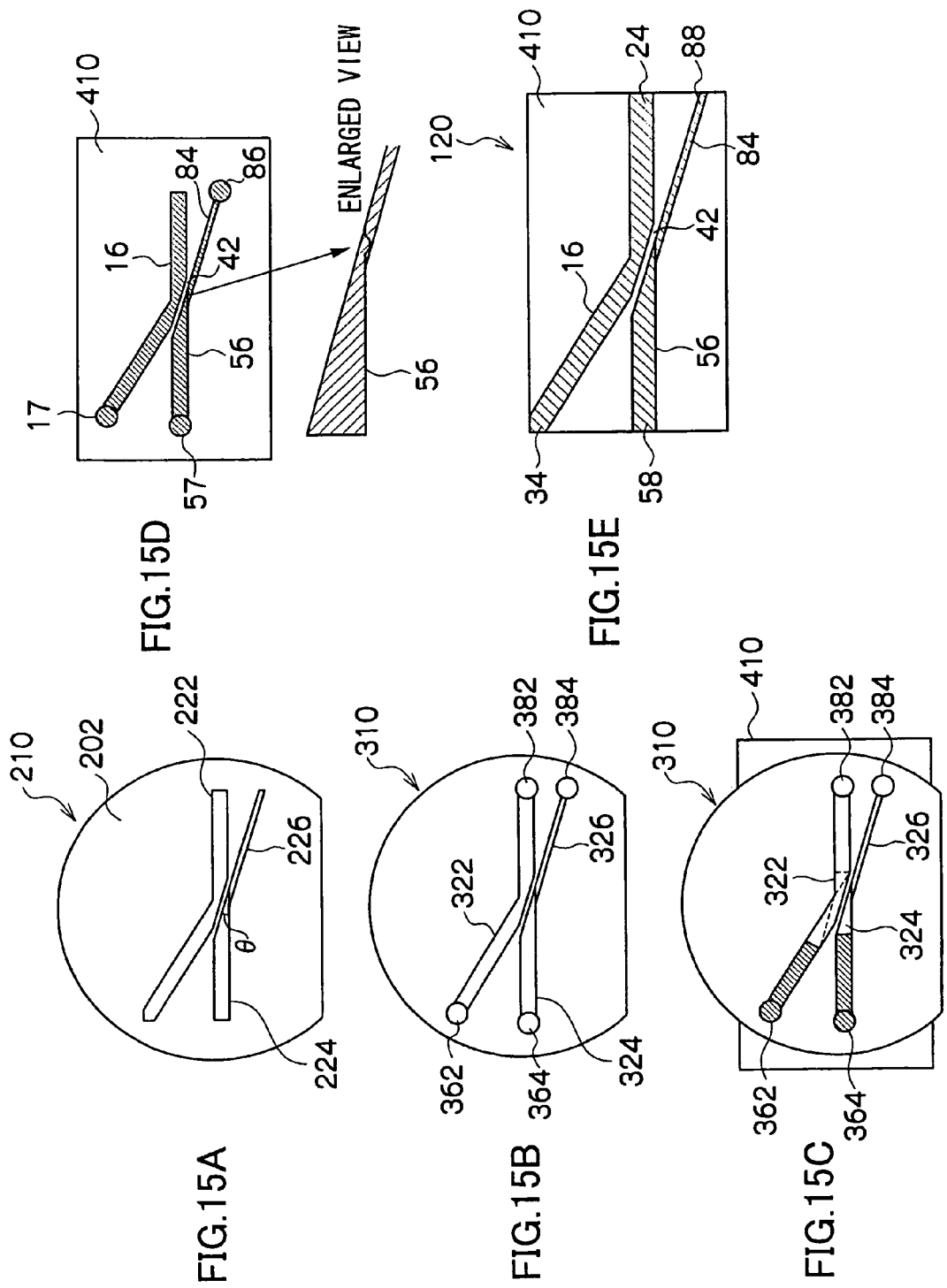

BIDIRECTIONAL COMMUNICATION OPTICAL WAVEGUIDE AND MANUFACTURING METHOD THEREOF

CROSS-REFERENCE TO RELATED APPLICATION

This application claims priority under 35 USC 119 from Japanese Patent Application Nos. 2004-317305, 2005-084917, 2005-084918, and 2005-300867, the disclosures of which are incorporated by reference herein.

BACKGROUND OF THE INVENTION

1. Field of the Invention

The present invention relates to a bidirectional communication optical waveguide, which constitutes a transmitting and receiving module for bidirectionally transmitting a light signal using an optical fiber and a manufacturing method thereof.

2. Description of the Related Art

Conventionally, as a module using one optical fiber to bidirectionally transmit and receive light signals, a technology is generally used in which up and down signals having different wavelengths are utilized and the up and down signals are separated from each other by inserting a reflection plate having frequency selectivity within a module. However, in this configuration, it is necessary that the reflection plate having the frequency selectivity be separately provided in addition to a focusing lens, which results in inevitable cost increase in the module. Further, a transmitting and receiving module is also required, and the transmitting and receiving module is equipped with a combination of a dedicated light receiving device and a dedicated light emitting device according to the wavelengths used in the up and down signals, which results in complication and cost increase.

In order to avoid such problems, it is thought that the same wavelength is used for the bidirectional signals. For such techniques, for example, there is proposed a configuration in which the light receiving device is placed on a concentric circle of a surface light emitting device to perform bidirectional communication (for example, see Japanese Patent Application Laid-Open (JP-A) No. 58-191543). However, in this technique, transmission light from the light emitting device cannot be prevented from being reflected by an end surface of the optical fiber to return to the adjacent light receiving device on the same module side. Therefore, there arise many problems in receiving sensitivity.

There is also disclosed a technology in which a waveguide is used to realize bidirectional communication utilizing the same wavelength (for example, see JP-A No. 11-271548). The problem that the transmitted light from the light emitting device turns to a light receiving device on the same module is not generated in this technology. However, an input light beam from the optical fiber is inputted as stray light to the light emitting device side to some extent. In this technology, although the sub-waveguide is formed thinner than the main waveguide in order to prevent the stray light input, some slight stray light input cannot be avoided. When such stray light exists, output becomes unstable when using a semiconductor laser as a light emitting device, which generates a problem that a light signal level is changed. This problem is generated not only in an edge emitting type laser but also in a VCSEL (surface emitting laser).

There is also disclosed a technology in which an isolation function is realized by coupling single-mode waveguides having different refractive indexes and core diameters (for example, see JP-A No. 04-293004). However, because core shape conditions differ from each other, the isolation function is realized only by directly coupling the main waveguide and sub-waveguide, where core diameters differ from each other and refractive indexes differ from each other. Therefore, there is the problem that constraints on production being increased.

There is also disclosed a technology in which a pseudo-isolation function is realized by separately arranging a curved multi-mode waveguide having a tapered shape (see Journal of the Institute of Electronics, Information and Communication Engineers C-1, Vol. J82-C-1, No. 6, pp. 349-358 (1999)). All the refractive indexes of the waveguide cores are equal to one another, and the shapes of the waveguide cores are not optimized, so that there is the problem that coupling loss becomes large.

Thus, the module which causes the input and output signals from and to the optical signal to propagate stably without loss is required in order to realize the simply configured transmission and reception module for performing the bidirectional communication with the light signals having the same wavelengths. However, the sufficient technology for forming the module is not obtained yet.

SUMMARY OF THE INVENTION

In view of the foregoing, the present invention provides a bidirectional communication optical waveguide being able to adopt a configuration in which the light sources having the same wavelengths are used and the stray light is not inputted to both the light emitting device and the light receiving device, and the bidirectional communication optical waveguide which realizes a bidirectional communication module.

A first aspect of the invention is a bidirectional communication optical waveguide including a main waveguide core which has a bent portion in a midway in an optical waveguide direction, a main inclined plane forming a constant inclined angle with an optical axis of a pre-bending main waveguide core at the bent portion; and a sub-waveguide core which is provided with a sub-inclined plane in one end portion thereof, the sub-inclined plane being substantially parallel to the main inclined plane, the sub-waveguide core being brought close to the main waveguide core at the bent portion while the sub-inclined plane and the main inclined plane face each other, wherein the main waveguide core has a pre-bending main waveguide core end portion and a post-bending main waveguide core end portion, the pre-bending main waveguide core end portion inputting and outputting a bidirectional light signal from and to an optical fiber, the post-bending main waveguide core end portion being connected to a light receiving device, and the main waveguide core has a structure in which an input light beam from the pre-bending main waveguide core end portion is deflected by total reflection at the main inclined plane and guided to the post-bending main waveguide core end portion, and the sub-waveguide core has a sub-waveguide core end portion on an opposite side to the side on which the sub-waveguide core is brought close to the main waveguide core, the sub-waveguide core end portion being connected to a light emitting device, and the sub-waveguide core has a structure in which a refractive index of the sub-waveguide core is set not more than a refractive index of the main waveguide core and thereby total transmission of an output light beam from the light emitting device is performed through the sub-inclined plane to cause the output light beam to propagate to the main waveguide core.

A second aspect of the invention is a bidirectional communication optical waveguide manufacturing method including 1) preparing a mold which is formed from a curable resin layer made of a mold forming curable resin, recess portions and through-holes being provided at least in a thickness direction in the mold, the recess portions corresponding to a main waveguide core and a sub-waveguide core, the through-holes being coupled to a resin intruding ends and a resin discharging end of the recess portion respectively; 2) bringing a cladding substrate in close contact with the mold, the cladding substrate having good adhesion propertied to the mold; 3) filling the through-holes with core forming curable resins, and bringing the core forming curable resins in contact with the resin intruding ends to cause the core forming curable resins into the recess portions corresponding to the main waveguide core and the sub-waveguide core, the through-holes being coupled to the resin intruding ends of the recess portions corresponding to the main waveguide core and the sub-waveguide core; and 4) curing the core forming curable resin caused to intrude.

A third aspect of the invention is a bidirectional communication optical waveguide manufacturing method including 1) preparing a mold which is formed from a curable resin layer made of a mold forming curable resin, recess portions and through-holes being provided at least in a thickness direction in the mold, the recess portions corresponding to a main waveguide core, a sub-waveguide core, and a monitor waveguide core, the through-holes being coupled to a resin intruding end and a resin discharging end of the recess portion respectively; 2) bringing a cladding substrate in close contact with the mold, the cladding substrate having good adhesion propertied to the mold; 3) filling the through-holes with core forming curable resins, and bringing the core forming curable resins in contact with the resin intruding ends to cause the core forming curable resins into the recess portions corresponding to the main waveguide core, the sub-waveguide core, and the monitor waveguide core, the through-holes being coupled to the resin intruding ends of the recess portions corresponding to the main waveguide core, the sub-waveguide core, and the monitor waveguide core; and 4) curing the core forming curable resin caused to intrude.

BRIEF DESCRIPTION OF THE DRAWINGS

Embodiments of the present invention will be described in detail based on the following figures, wherein:

FIGS. 4A to 4E are a schematic view showing a process of manufacturing the bidirectional communication optical waveguide according to the invention;

FIGS. 15A to 15E are a schematic view showing a process of manufacturing the bidirectional communication optical waveguide (with monitor waveguide core) according to the invention.

DETAILED DESCRIPTION OF THE INVENTION

Hereinbelow, the present invention will be described in detail.

(Bidirectional Communication Optical Waveguide)

A bidirectional communication optical waveguide of the invention includes a main waveguide core which has a bent portion in a midway in an optical waveguide direction, and which is provided with a main inclined plane forming a constant inclined angle with an optical axis of a pre-bending main waveguide core at the bent portion; and a sub-waveguide core which is provided with a sub-inclined plane in one end portion thereof, the sub-inclined plane being substantially parallel to the main inclined plane, the sub-waveguide core being brought close to the main waveguide core at the bent portion while the sub-inclined plane and the main inclined plane face each other, wherein the main waveguide core has a pre-bending main waveguide core end portion and a post-bending main waveguide core end portion, the pre-bending main waveguide core end portion inputting and outputting a bidirectional light signal from and to an optical fiber, the post-bending main waveguide core end portion being connected to a light receiving device, and the main waveguide core has a structure in which an input light beam from the pre-bending main waveguide core end portion is deflected by total reflection at the main inclined plane and guided to the post-bending main waveguide core end portion, and the sub-waveguide core has a sub-waveguide core end portion on an opposite side to the side on which the sub-waveguide core is brought close to the main waveguide core, the sub-waveguide core end portion being connected to a light emitting device, and the sub-waveguide core has a structure in which a refractive index of the sub-waveguide core is set not more than a refractive index of the main waveguide core and thereby total transmission of an output light beam from the light emitting device is performed through the sub-inclined plane to cause the output light beam to propagate to the main waveguide core.

A structure of a bidirectional communication optical waveguide according to the invention will be described in detail with reference to the drawings.

Figure 1:
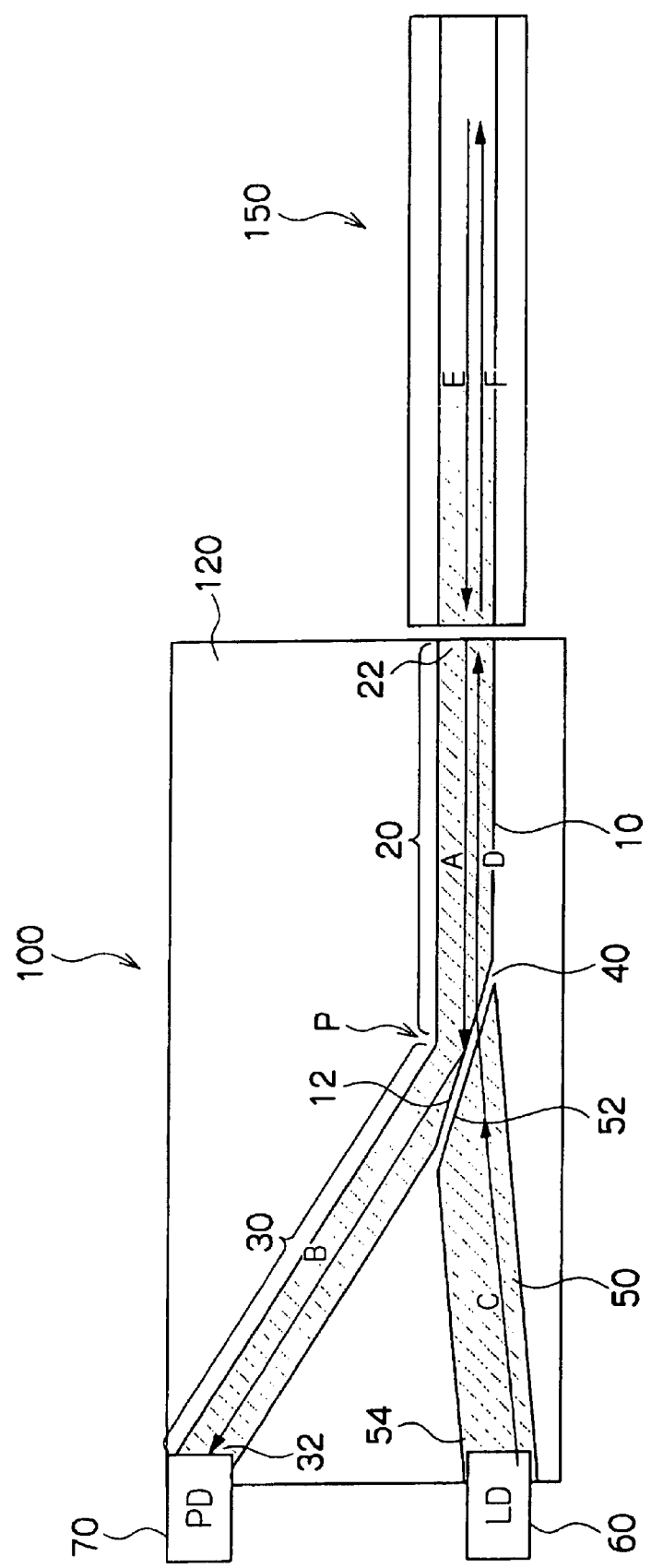
FIG. 1 shows a schematic configuration of a bidirectional communication module including a bidirectional communication optical waveguide according to the invention.
Figure 2:
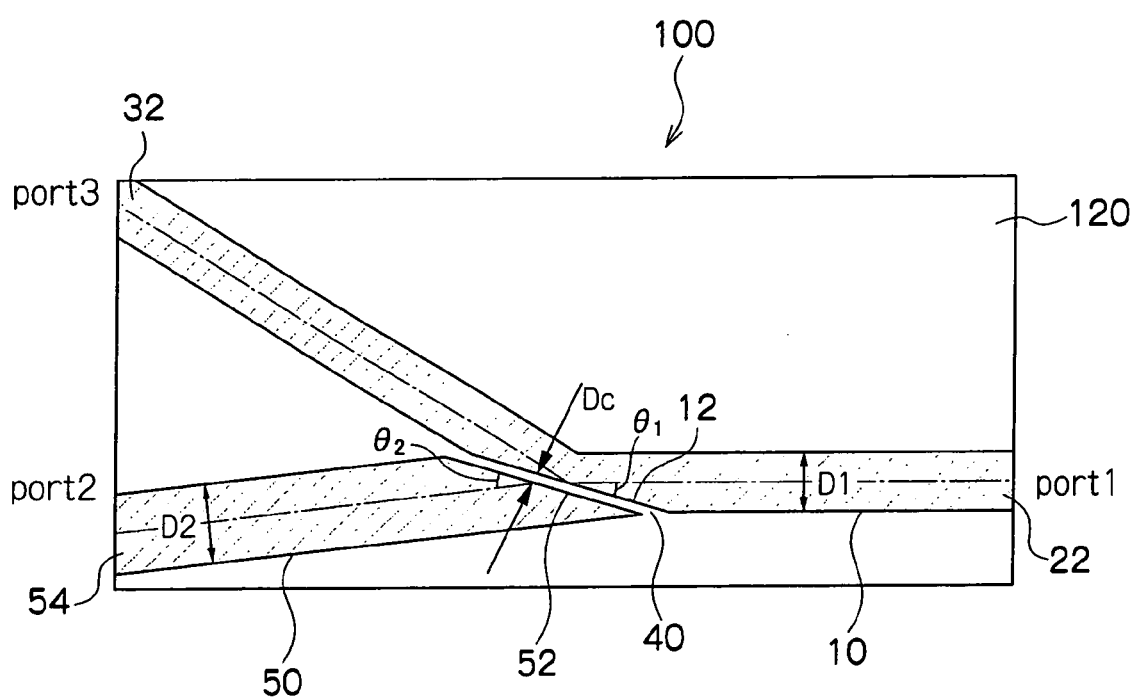
FIG. 2 is a plan view showing a configuration of the bidirectional communication optical waveguide according to the invention.

FIG. 1 is a schematic view (a plan view) showing an example of a configuration of a bidirectional communication optical waveguide of the invention (hereinafter sometimes referred simply to as "optical waveguide"), and a bidirectional communication module in which the optical fiber, the light receiving device, and the light emitting device are connected to the bidirectional communication optical waveguide. FIG. 2 is a partially enlarged plan view showing peripheries of a main waveguide core curvilinear portion in the configuration of the bidirectional communication optical waveguide of the invention. In this case, the waveguide core is indicated by solid lines in the drawings for the sake of clarity, although the waveguide core is actually configured to be covered with the cladding.

As shown in FIG. 1, a bidirectional communication optical waveguide 100 according to the invention includes a main waveguide core 10 and a sub-waveguide core 50 on a surface of a cladding substrate 120. The main waveguide core 10 has a bent portion P in a midway in a direction toward which the light beam is guided, and the sub-waveguide core 50 is brought close to the main waveguide core 10 through a cladding portion 40. The main waveguide core 10 includes a pre-bending main waveguide core 20 and a post-bending main waveguide core 30, at both sides of the bent portion P.

A main inclined plane 12 is provided in the bent portion P of the main waveguide core 10, and a main inclined angle $\theta_1$ is formed between the main inclined plane 12 and an optical axis (axis in an arrow A direction) of the pre-bending main waveguide core 20. A sub-inclined plane 52 substantially parallel to the main inclined plane 12 is provided at one of end portions of the sub-waveguide core 50. The main inclined plane 12 and the sub-inclined plane 52 are arranged on the opposite sides of the cladding portion 40 while brought close to each other.

Figure 5:
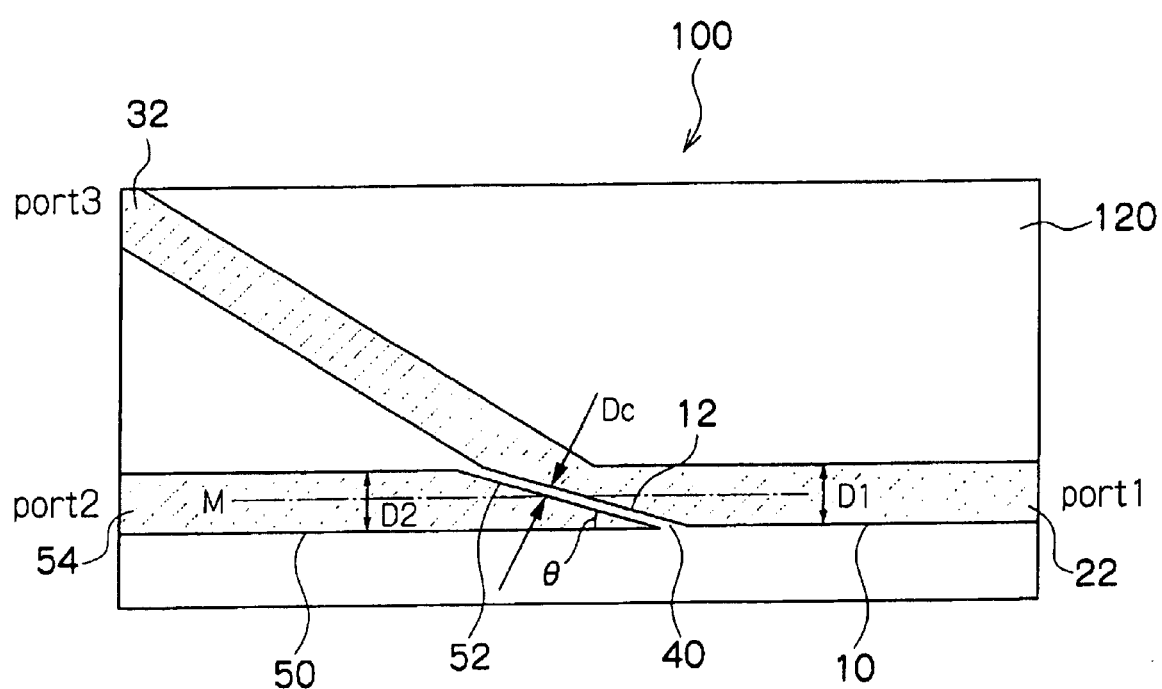
FIG. 5 is a plan view showing another configuration of the bidirectional communication optical waveguide according to the invention.

In an example in FIG. 1, the sub-waveguide core 50 is arranged such that the optical axes of the sub-waveguide core 50 and the pre-bending main waveguide core 20 intersect each other. In the case where the later-mentioned basic conditions are satisfied as described in FIG. 5, the sub-waveguide core 50 can be arranged such that the optical axes of the sub-waveguide core 50 and the pre-bending main waveguide core 20 are linearly aligned with each other.

In the present invention, as shown in FIG. 1, the main waveguide core 10 and the sub-waveguide core 50 are brought close to each other with the cladding having a constant interval through the main inclined plane 12 and the sub-inclined plane 52. This is the extremely advantageous structure for satisfying the condition that the light beam propagating through the bent portion P from the pre-bending main waveguide core 20 does not leak from the main inclined plane 12.

In the case where the main waveguide core 10 is smaller than the sub-waveguide core 50 in a refractive index, the structure in which the main waveguide core 10 and the sub-waveguide core 50 are directly coupled to each other can also be formed. However, in this case, because a difference in refractive index is decreased in the main inclined plane 12 when compared with the structure in which the main waveguide core 10 and the sub-waveguide core 50 are arranged close to each other, there is a problem that the leakage from the main inclined plane 12 is increased. From the viewpoints of core outer diameter accuracy and man-hour, it is not preferable to prepare the bidirectional communication optical waveguide in the structure in which the cores having the different refractive indexes are directly coupled to each other.

The main waveguide core 10 has a pre-bending main waveguide core end portion 22 and a post-bending main waveguide core end portion 32. The a pre-bending main waveguide core end portion 22 is connected to a communication optical fiber 150 to input and output the bidirectional light signal. The post-bending main waveguide core end portion 32 is connected to a light receiving device 70. An input light beam propagating through the optical fiber 150 in an arrow E direction propagates through the pre-bending main waveguide core 20 in the arrow A direction from the pre-bending main waveguide core end portion 22, and the input light beam reaches the main inclined plane 12.

The main inclined angle $\theta_1$ is formed by the main inclined plane 12 and the optical axis of the input light beam (axis of main waveguide core). When the main inclined angle $\theta_1$ is defined so as to satisfy the following expression (1), the input light beam which reaches the main inclined plane 12 is deflected by total reflection with the main inclined plane 12, and the input light beam is guided in an arrow B direction through the post-bending main waveguide core 30 to the post-bending main waveguide core end portion 32 connected to the light receiving device 70:

$$\sin\theta_1/((n_1^2-n_0^2)^{1/2}/n_1)<1 \qquad (1)$$

where $n_1$ is the refractive index of the main waveguide core 10 and $n_0$ is the refractive index of the cladding portion.

On the other hand, the sub-waveguide core 50 provided independently of the main waveguide core 10 has a sub-waveguide core end portion 54 connected to a light emitting device 60. An output light beam emitted toward an arrow C direction from the light emitting device 60 is guided in the direction parallel to the optical axis of the sub-waveguide core 50, and the output light beam reaches the sub-inclined plane 52. The sub-inclined plane 52 is located across the cladding portion 40 from the main inclined plane 12 while being parallel to the main inclined plane 12.

An inclined angle $\theta_2$ is formed by the optical axis of the output light beam and the sub-inclined plane 52. Assuming that the refractive index of the sub-waveguide core 50 is set to $n_2$, total transmission of the output light beam, which reaches the sub-inclined plane 52, is generated when each refractive index is selected so as to satisfy the flowing expression (2):

$$\sin\theta_2/((n_2^2-n_0^2)^{1/2}/n_2)>1 \qquad (2)$$

The output light beam remains in the main waveguide when each refractive index satisfies the following expression (3). The output light beam propagates through the pre-bending main waveguide core 20 in an arrow D direction, and the output light beam is guided to the pre-bending main waveguide core end portion 22 connected to the optical fiber 150. Finally the output light beam is outputted to the optical fiber 150 through a connection end surface with the optical fiber 150.

$$\sin(\beta-\theta_1)/((n_1^2-n_0^2)^{1/2}/n_1)<1$$

$$\text{where } \beta=\sin^{-1}((n_2/n_1)\cos\theta_2). \qquad (3)$$

In the invention, the terms of "total reflection" and "total transmission" shall include not only the case in which 100% reflection or 100% transmission of the incident light beam is generated but also the case in which not less than 51% reflection or not less than 51% transmission of the incident light beam is generated.

In the optical waveguide of the invention, as described above, the total reflection of the output light beam from the optical fiber 150 is generated by the main inclined plane 12 and the total transmission of the output light beam from the light emitting device 60 is generated by the sub-inclined plane 52, which substantially eliminates feedback light to the optical fiber 150 and the light emitting device 60 or the leakage from the main waveguide core 10 to the sub-waveguide core 50. There, the bidirectional transmission and reception can efficiently be performed.

In the bidirectional communication optical waveguide of the invention, as the basic condition of achieving the bidirectional transmission and reception, it is necessary that the refractive index $n_2$ of the sub-waveguide core 50 is not more than the refractive index $n_1$ of the main waveguide core 10 ($n_2 \leq n_1$). When the refractive index $n_2$ of the sub-waveguide core 50 is more than the refractive index $n_1$ of the main waveguide core 10 ($n_2 > n_1$), in the bidirectional communication optical waveguide of the invention, the input light beam from the optical fiber 150 cannot be reflected by the light receiving device 70, and it is very difficult that the output light beam of the light emitting device 60 propagates through the optical fiber 150.

In this configuration, the left side of the expression (1) indicates a ratio of a light propagation angle from the optical fiber 150 to a confinement critical angle of the main waveguide core 10. The left side of the expression (3) indicates a ratio of the light propagation angle from the optical fiber 150 to the confinement critical angle of the main waveguide core 10. Therefore, it is desirable that the left sides of the expressions (1) and (3) are smaller than 1 as much as possible. It is desirable that the left sides are not more than 0.9, and it is more desirable that the left sides are not more than 0.83.

The left side of the expression (2) indicates a ratio of the light propagation angle from the light emitting device 60 to the confinement critical angle of the sub-waveguide core 50. Therefore, it is desirable that the left side of the expressions (2) is larger than 1 as much as possible. It is desirable that the left side is not less than 1.1, and it is more desirable that the left side is not less than 1.2.

It is advantageous that the inclined angle $\theta_2$ is large as much as possible in order that the light beam from the light emitting device 60 is confined and guided while the expression (2) is satisfied. On the contrary, it is advantageous that the inclined angle $\theta_1$ is as small as possible in order that the light beam from the optical fiber 150 does not leak at the main inclined plane 12. However, it is advantageous that a difference between the inclined angles $\theta_1$ and $\theta_2$ is as small as possible in order to satisfy the expression (3). In consideration of the above conditions, from the viewpoint of parameter design, it is advantageous that the inclined angle $\theta_1$ is not more than the inclined angle $\theta_2$ ($\theta_1 \leq \theta_2$) in order to satisfy the expression (3).

That is, from the viewpoint of parameter design, the advantageous configurations are as follows: (1) the configuration in which the optical axes of the sub-waveguide core 50 and the pre-bending main waveguide core 20 intersect each other and the inclined angle $\theta_1$ formed between the main inclined plane 12 and the optical axis of the pre-bending main waveguide core 20 is smaller than the inclined angle $\theta_2$ formed between the sub-inclined plane 52 and the optical axis of the sub-waveguide core 50 ($\theta_1 < \theta_2$), and (2) the configuration in which the optical axes of the sub-waveguide core 50 and the pre-bending main waveguide core 20 are linearly aligned with each other ($\theta_1 = \theta_2$).

Figure 6:
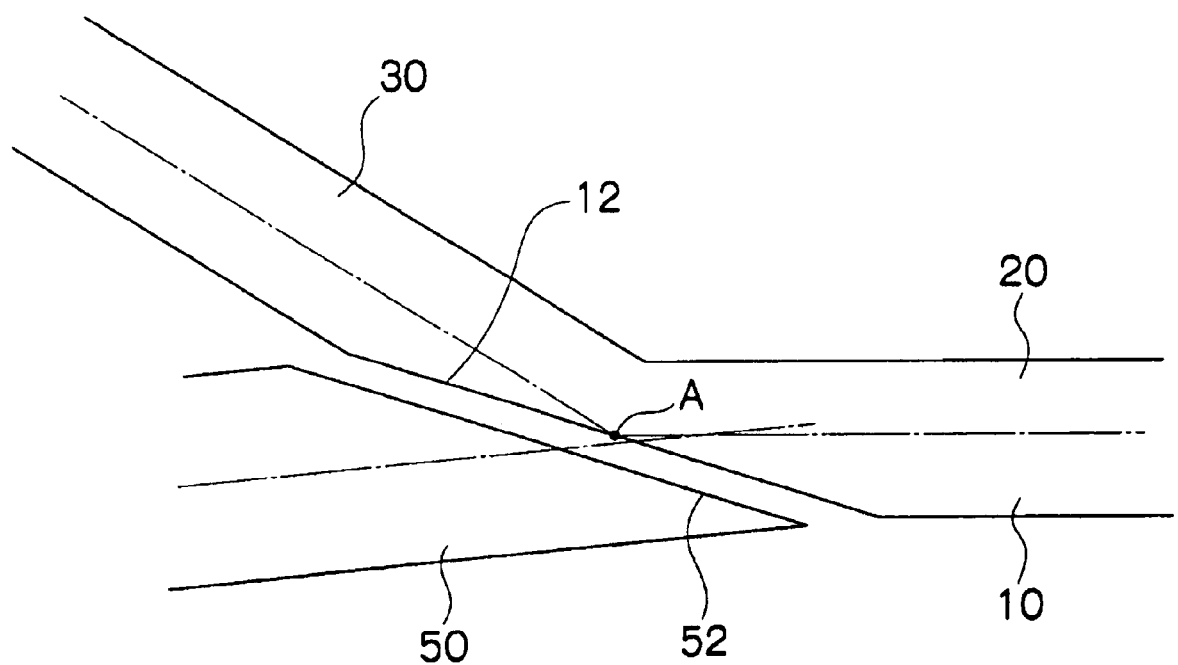
FIG. 6 is a partially enlarged view showing a configuration of peripheries of a main waveguide bent portion.

As shown in FIG. 6, in order to minimize coupling loss of the light propagating through the sub-waveguide core 50 from the light emitting device 60 to the main waveguide core 10, it is desirable that the optical axes of the main inclined plane 12 and the sub-waveguide core 50 are designed to intersect each other at a position within $\pm 0.5\ D_1$ from an intersection point A of the main inclined plane 12 and the optical axis of the pre-bending main waveguide core 20, more preferably within $\pm 0.3\ D_1$.

Figure 7:
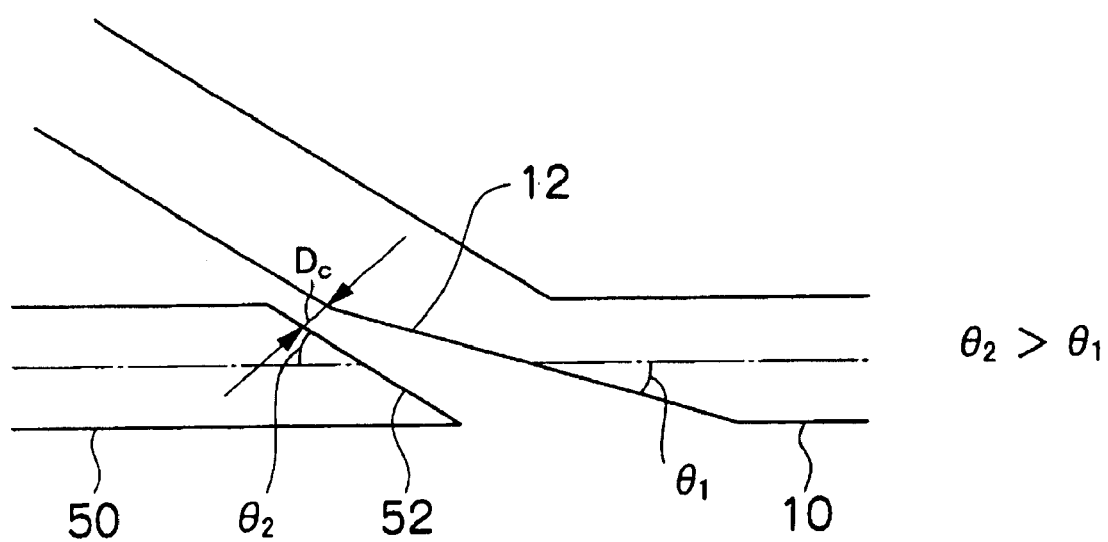
FIG. 7 shows broadening of a distance between a main inclined plane and sub-inclined plane.

The sub-inclined plane 52 substantially parallel to the main inclined plane 12 is provided in the above description. In addition, the design, in which the optical axes are parallel to each other and the inclined angle of the sub-inclined plane 52 is larger than that of the main inclined plane 12, also satisfies the condition of $\theta_1 < \theta_2$ as shown in FIG. 7. However, a distance between the main inclined plane 12 and the sub-inclined plane 52 is gradually increased by satisfying the relationship of $\theta_1 < \theta_2$.

As shown in FIG. 7, the distance between the main inclined plane 12 and the sub-inclined plane 52 is gradually increased, and sometimes the distance reaches several hundreds micrometers depending on the design. When the distance between main inclined plane 12 and the sub-inclined plane 52 is excessively increased, the light beam from the light emitting device is diverged from the sub-inclined plane 52 toward the side of the main inclined plane 12, which results in the inevitable increase in coupling loss. In order to decrease the coupling loss, it is thought that the sub-inclined plane 52 of the sub-waveguide core 50 is formed in a stepwise shape having a discontinuous surface.

Figure 8A:
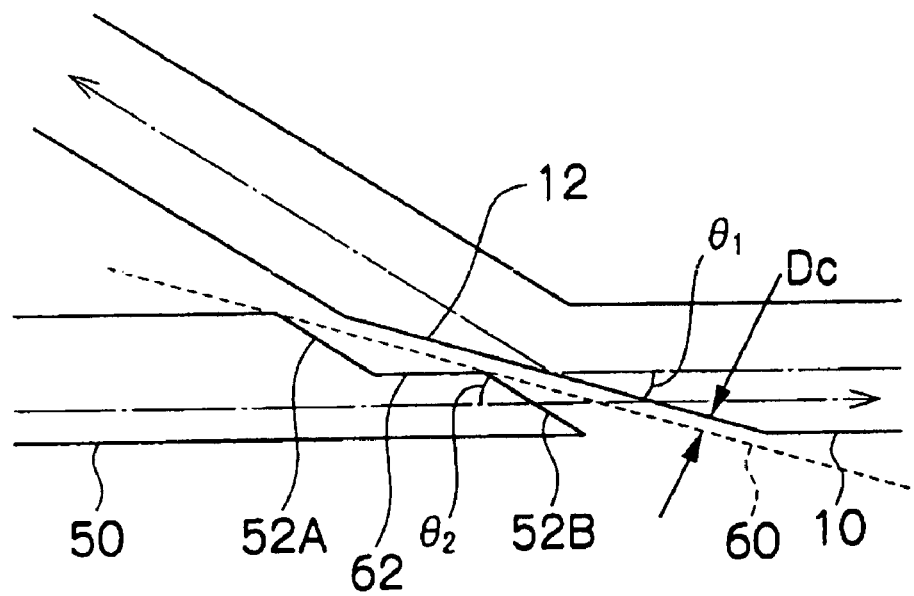
FIGS. 8A and 8B are a plan view showing another configuration of the bidirectional communication optical waveguide according to the invention in which the sub-inclined plane is formed in a step shape.

For example, as shown in FIG. 8A, the sub-inclined plane 52 is formed in the discontinuous surface having one step. In FIG. 8A, inclined portions 52A and 52B, which forms the incline angle $\theta_2$ with the optical axis of the sub-waveguide core 50, is provided in the sub-inclined plane 52. A landing portion 62 parallel to the optical axis of the sub-waveguide core 50 is provided between the inclined portions 52A and 52B at the position where the sub-waveguide core 50 is equally divided into two in a width direction. The inclined portions 52A and 52B are connected to each other by the landing portion 62. An imaginary surface 64 is provided in the landing portion 62. In the imaginary surface 64 is parallel to the main inclined plane 12, and the distance between the main inclined plane 12 and the imaginary surface 64 is set at a minimum distance Dc. A corner of the landing portion 62 is formed so as to be in contact with the imaginary surface 64.

Therefore, the sub-inclined plane 52 can be brought close to the main inclined plane 12 to some extent irrespective of the magnitude of the inclined angle $\theta_2$.

As described later, when the cladding portion 40 is used as an upper cladding layer, preferably the cladding portion 40 is integrally formed with the upper cladding layer. However, the cladding portion 40 may be made of a material different from that of the upper cladding layer as long as the cladding portion 40 is lower than the main waveguide core or the sub-waveguide core in the refractive index.

According to the above basic configuration, the input light beam propagating through the pre-bending main waveguide core 20 from the communication optical fiber 150 reaches the light receiving device 70 while the input light beam does not leak onto the side of the light emitting device 60. On the other hand, the output light beam from the light emitting device 60 can reach the communication optical fiber 150 while the output light beam does not leak onto the side of the light receiving device 70. Because these can be realized irrespective of a wavelength of the used light beam, the input light beam and the output light beam can be set at the same wavelength.

In addition to the above basic configuration, in the invention, when the end surface of the optical fiber through which the light signal is transmitted is arranged opposite to the end portion of the pre-bending main waveguide core, namely, when the light connection is directly performed without using a focusing lens or the like, it is preferable that a numerical aperture $NA_1$ of the main waveguide core is substantially equal to a numerical aperture $NA_f$ of the optical fiber, namely, it is preferable that the difference in numerical apertures is set within 0.5, it is more preferable that the difference in numerical apertures is set within 0.3, and it is particularly preferable that the difference in numerical apertures is set within 0.1. That is, when the numerical aperture $NA_1$ of the main waveguide core 10 is set to at least the numerical aperture $NA_f$ of the connected communication optical fiber 150, the coupling loss of the input light beam propagating from the optical fiber 150 can be minimized, even if the communication optical fiber 150 is directly connected to the main waveguide core 10 while a lens is not arranged between the communication optical fiber 150 and the main waveguide core 10.

The numerical aperture $NA_1$ of the main waveguide core 10 is a value which is represented by $\sin^{-1}(n_1^2 - n_0^2)^{1/2}$, where $n_1$ is the refractive index of the main waveguide core 10 and $n_0$ is the refractive index of the cladding portion 40. When the numerical aperture $NA_f$ of the optical fiber 150 is known, the numerical aperture $NA_1$ and the numerical aperture $NA_f$ can be set within the above range by adjusting the refractive indexes of the main waveguide core 10 and the cladding portion 40.

In the bidirectional communication optical waveguide of the invention, when the angle formed by the main inclined plane 12 and the optical axis of the pre-bending main waveguide core 20 is set at $\theta_1$ it is preferable that the angle formed by the optical axes of the pre-bending main waveguide core 10 and post-bending main waveguide core 30, which intersect each other at the bent portion P, is $(2\pm0.5)\theta_1$.

The main waveguide core 10 is prepared such that the bent angle (angle formed by the main inclined plane 12 and the optical axis of the pre-bending main waveguide core 20) of the main waveguide core 10 at the bent portion P substantially becomes $2\theta_1$ to the inclined angle $\theta_1$ of the main inclined plane 12. Therefore, the loss of the input light beam which is totally reflected by the main inclined plane 12 to reach the light receiving device 70 can be minimized.

Accordingly, it is more preferable that the bent angle is $(2\pm0.5)\theta_1$, and it is particularly preferable that the bent angle is $2\theta_1$. In the downstream portion of the post-bending main waveguide core 30, it is obviously possible that a size (width) of the waveguide is totally decreased by introducing a bending element in the midway of the waveguide.

FIG. 2 is a plan view showing the detailed configuration of the bidirectional communication optical waveguide of the invention, which is used in the bidirectional communication module shown in FIG. 1. Referring to FIG. 2, the optical fiber, the light emitting device, and the light receiving device, which are connected in FIG. 1, are taken out, while a port 1, a port 2, and a port 3 are provided.

As shown in FIG. 2, in the configuration in which the main waveguide core 10 and the sub-waveguide core 50 are brought close to each other at the bent portion P and the main inclined plane 12 and the sub-inclined plane 52 are arranged opposite to each other at the constant distance Dc while being parallel to each other, scattering loss of the output light beam propagating from the sub-waveguide core 50 to the main waveguide core 10 can be minimized by sufficiently decreasing the distance Dc.

However, from the viewpoint of waveguide preparing process, it is obvious that the optical waveguide is easily formed when the distance Dc is large. Therefore, in the invention, it is found that the optical waveguide is easily manufactured while the loss is suppressed at the minimum by satisfying the following expression:

$$0.1 D_1 \leq D_c \leq D_1 \quad (4)$$

where $D_c$ is the distance between a tangent $Q_2$ in the center of the main inclined plane 12 and the sub-inclined plane 52 and D1 is the width (usually the same value in the pre-bending main waveguide core 20 and the post-bending main waveguide core 30) of the main waveguide core 10.

It is more preferable that $0.2 D_1 \leq D_c \leq 0.5 D_1$. When $D_c$ is lower than $0.1 D_1$, sometimes it is difficult to actually manufacture the optical waveguide. When $D_c$ is more than $D_1$, there is a fear that the loss of the output light beam propagating from the sub-waveguide core 50 to the main waveguide core 10 is remarkably increased.

In the invention, it is preferable to satisfy the relationship of the following expression (5):

$$0.1 D_1 \leq D_2 \leq D_1 \quad (5)$$

where $D_1$ is the width of the main waveguide core 10 and $D_2$ is the width of the sub-waveguide core 50.

Therefore, a quantity of light, among input light propagated from the optical fiber 150, which is not reflected by the main inclined plane 12 but transmitted through the main inclined plane 12 to intrude into the sub-waveguide core 50 as stray light, can be decreased in the input light. However, when $D_2$ is immoderately decreased, a position tolerance becomes strict in coupling the optical waveguide to the light emitting device or the coupling efficiency is decreased, so that it is necessary to determine the values in consideration of the balance therebetween.

In the above description, the sub-waveguide core 50 is substantially formed by the linear portions. However, it is obviously possible that the bending element is properly inserted in the range where the bending loss of the waveguided light beam can be neglected according to the arrangement of the light receiving device and light emitting device or the optical fiber.

The above-described bidirectional communication optical waveguide of the invention is usually prepared in such a manner that a waveguide core having the desired shape is formed on the surface of a cladding substrate (sometimes a cladding layer is provided on the substrate) to further form the upper cladding layer on the surface of the waveguide core. Both inorganic materials such as quart and polymers such as polyimide may be used as the material of the waveguide core. The cladding substrate and the like will be described in detail later.

For the formation of the waveguide core, although the waveguide core can be prepared by the generally used method such as photolithography and RIE (Reactive Ion Etching), usually there is the problem that cost increased. Particularly, since it is desirable to prepare the core shapes having two different refractive indexes, there is the problem that the cost is further increased. Therefore, from the viewpoint of cost reduction, it is preferable that the method to which a polymer optical waveguide manufacturing method disclosed in JP-A No. 2004-29507 proposed by the inventors as described later is applied is used as the method of preparing the bidirectional communication optical waveguide of the invention.

(Bidirectional Communication Optical Waveguide Manufacturing Method)

A bidirectional communication optical waveguide manufacturing method of the invention includes 1) preparing a mold which is formed from a curable resin layer made of a mold forming curable resin, recess portions and through-holes being provided at least in a thickness direction in the mold, the recess portions corresponding to a main waveguide core and a sub-waveguide core, the through-holes being coupled to a resin intruding ends and a resin discharging end of the recess portion respectively; 2) bringing a cladding substrate in close contact with the mold, the cladding substrate having good adhesion propertied to the mold; 3) filling the through-holes with core forming curable resins, and bringing the core forming curable resins in contact with the resin intruding ends to cause the core forming curable resins into the recess portions corresponding to the main waveguide core and the sub-waveguide core, the through-holes being coupled to the resin intruding ends of the recess portions corresponding to the main waveguide core and the sub-waveguide core; and 4) curing the core forming curable resin caused to intrude.

The waveguide cores having the different refractive indexes can simultaneously be formed by preparing the optical waveguide using the manufacturing method of the invention, which results in the efficient production and the low cost. Further, unlike the etching method and the like, it is not necessary that the different waveguide cores are formed so many times, so that the damage is not caused to the already formed waveguide core in the process of forming another waveguide core. Therefore, the high-quality optical waveguide can be prepared.

A basic process of the method of manufacturing the bidirectional communication optical waveguide of the invention will schematically be described by the case in which the one waveguide core is provided.

Figure 3A:
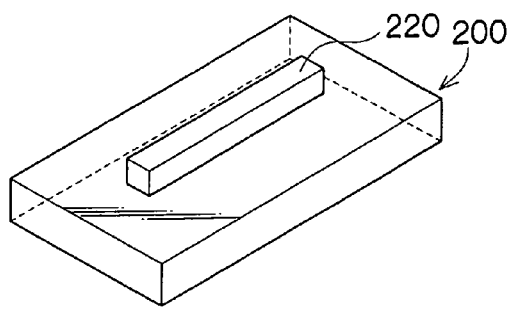
FIGS. 3A to 3G are a schematic diagram showing a process of preparing an optical waveguide.
Figure 3B:
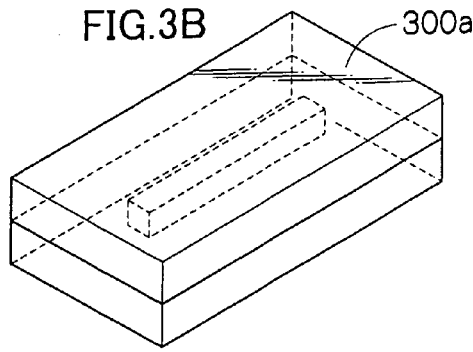
Figure 3C:
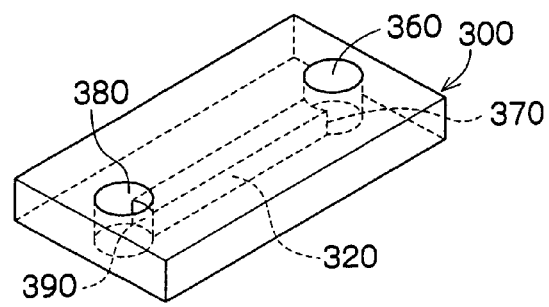

FIGS. 3A to 3G are a schematic diagram showing the process of manufacturing the optical waveguide. FIG. 3A show a master plate 200, and the numeral 220 designates a projection portion (hereinafter sometimes referred to as "waveguide core projection portion") corresponding to the waveguide core. A mold forming curable resin is applied to or injected into the projection portion formed surface of the master plate 200, and the mold forming curable resin is cured (see FIG. 3B). In FIG. 3B the numeral 300a designates a curable resin layer. Then, when the curable resin layer 300a is peeled off, the curable resin layer 300a (not shown) in which a recess portion (hereinafter sometimes referred to as "waveguide core recess portion") corresponding to the waveguide core is formed is obtained. Through-holes 360 and 380 communicating with a waveguide core recess portion 320 are made in the curable resin layer 300a, in which the waveguide core recess portion 320 is formed, by punching in the both end portions of the recess portion to obtain the mold 300 (see FIG. 3C). In the mold 300, the end portions on the side of the through-hole 360 of the waveguide core recess portion 320 becomes a resin input end 370 and the end portion on the side of the through-hole 380 becomes a resin output end 390.

Figure 3D:
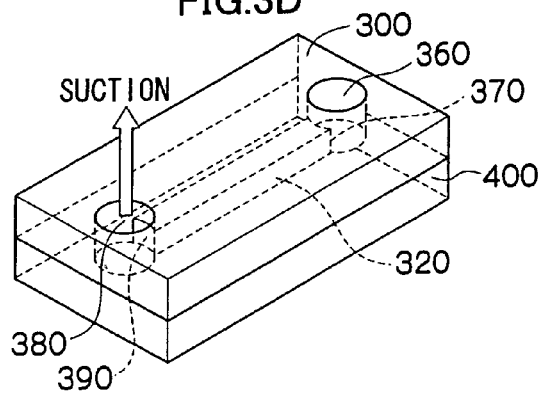
Figure 3E:
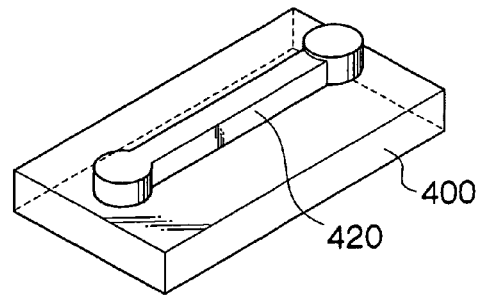
Figure 3F:
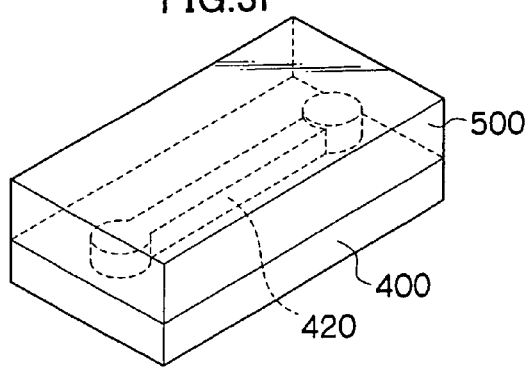

Then, as shown in FIG. 3D, a cladding substrate 400 is brought in close contact with the mold 300. Then, a core forming curable resin is inputted in the through-hole 360 made in the mold. The core forming curable resin is caused to come into contact with the resin input end 370, and the waveguide core recess portion 320 of the mold is filled with the core forming curable resin by capillarity or by performing suction from the resin output end 390 through the through-hole 380 to reduce pressure. When the core forming curable resin is cured to peel the mold, a waveguide core 420 is formed on the cladding substrate 400 as shown in FIG. 3E.

Figure 3G:
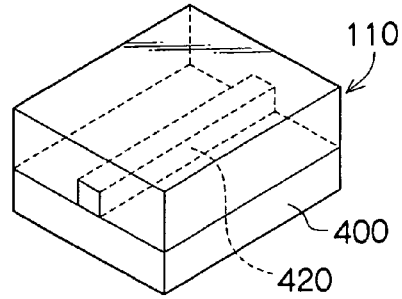

Then, an upper cladding layer 500 is formed (see FIG. 3F), and the resin portions cured in the through-holes 360 and 380 are cut with a dicing saw or the like to obtain an optical waveguide 110 (see FIG. 3G).

In the process of FIG. 3, after the waveguide core is formed using the mold 300, the mold 300 is peeled off to provide the upper cladding layer 500. Alternatively, as described later, depending on the material of the mold, the mold can directly be used as the upper cladding layer without peeling the mold 300.

A method of manufacturing bidirectional communication optical waveguide of the invention will be described in the order of the processes with reference to FIG. 4. FIGS. 4A to 4E are a schematic view (plan view) sequentially showing the process of manufacturing the bidirectional communication optical waveguide shown in FIG. 2. In FIGS. 4A to 4E, for the sake of simplifying the explanation, sometimes the waveguide core and the recess portion and projection portion for preparing the waveguide core are indicated by the solid line and other portions (members) are omitted.

(Process of Preparing Mold)

It is preferable that the mold is prepared using the master plate in which the projection portion corresponding to the waveguide core is formed as described above. However, the invention is not limited to the master plate in which the projection portion corresponding to the waveguide core is formed. The method in which the master plate is used will be described below.

As shown in FIG. 4A, a master plate 210 is first prepared. In the master plate 210, a main waveguide core projection portion 222 and a sub-waveguide core projection portion 224 are formed on a silicon substrate 202, and a linear air vent passage (communication passage) projection portion 226 is formed at the leading end of the sub-waveguide core projection portion 224 on the main waveguide core projection portion side in order to provide the resin output end of the sub-waveguide core corresponding to the recess portion.

The conventional methods such as the photolithography, RIE, and mechanical forming can be used with no limitation as the method of preparing the master plate 210, in which the projection portions are formed. The size (core diameter) of the projection portion, formed in the master plate, corresponding to the waveguide core usually ranges from 5 to 500 μm, and preferably ranges from 40 to 200 μm. The size of the projection portion is appropriately determined according to the application of the optical waveguide. For example, in the case of the single-mode optical waveguide, the rectangular core measuring about 10 μm per side is usually used. In the case of the multi-mode optical waveguide, the rectangular core having a side ranging from 40 to 150 μm is usually used. An optical waveguide having a further large core portion of about several hundreds μm is also utilized depending on the applications such as POF.

Because there is a fear that the light beam leaks from the air vent passage projection portion 226 in the finally completed optical waveguide, preferably the size of the air vent passage projection portion 226 is sufficiently smaller than the sub-waveguide core projection portion 224 corresponding to sub-waveguide core. Therefore, in the case where the core forming curable resin is caused to intrude by the suction from the air vent passage projection portion 226 as described later, there is the advantage that the air vent passage projection portion 226 is hardly filled with the core forming curable resin.

The mold forming curable resin is applied onto or injected into the surface in which the projection portion is formed corresponding to the waveguide core of the master plate prepared in the above way, and a drying process is performed as needed. Then, the mold forming curable resin is cured and the mold forming curable resin is peeled off to prepare the curable resin layer, which becomes the mold.

FIG. 4B shows the state of the prepared mold when viewed from the opposite side to the peeling surface. In the mold 310 including the curable resin layer, a main waveguide core recess portion 322 and sub-waveguide core recess portion 324 corresponding to the cores respectively are formed, and a linear air vent passage (communication passage) recess portion 326 is formed at the leading end of the sub-waveguide core recess portion 324 on the side the main waveguide core recess portion 322 in order to provide the resin output end of the sub-waveguide core corresponding to the recess portion.

Although it is thought that the air vent passage recess portion 326 is slightly filled with the core forming curable resin, it is also preferable that the scattering loss is minimized at the air vent passage recess portion 326. Therefore, assuming that $\theta_2$ is the angle formed by the sub-inclined plane and the optical axis of the sub-waveguide core and $\alpha$ is the angle formed by the recess portion (air vent passage recess portion 326) corresponding to the linear communication passage and the recess portion (sub-waveguide core recess portion 324) corresponding to the sub-waveguide core, it is preferable that $\alpha$ is in the range shown by the following expression (7):

$$\theta_2 < \alpha \leq \pi/2 \text{(rad)}, \tag{7}$$

In the drawing, $\alpha$ and $\theta_2$ indicate the angles at the corresponding recess portions, respectively.

In the case where $\alpha$ is 90°, i.e., in the case where the air vent passage recess portion 326 and the sub-waveguide side surface intersect each other, the size of the defect caused by providing the air vent passage can be minimized in the sub-waveguide side surface. In the case $\alpha$ is brought close to the angle $\theta_2$ of the sub-inclined plane, an obtuse shape can be minimized at the leading end of the sub-inclined plane. Therefore, it is desirable that the angle in the above range is selected as $\alpha$. For the diameter of the air vent passage recess portion 326, the size and the shape can appropriately be selected in consideration of the above object and production easiness.

A resin intruding end for filling the recess portions with the core forming curable resin and a resin discharging end for discharging the core forming curable resin from the recess portions are formed in the mold 310 including the curable resin layer. As shown in FIG. 4B, the effective method of forming the resin intruding end and the resin discharging end is to provide through-holes 362, 364, 382, and 384 at both ends of the recess portion (and end portions of the communication passage recess portion) in the curable resin layer.

The resin intruding end and the resin discharging end are simultaneously formed by forming the through-holes. Further, the through-hole on the resin intruding end side can be utilized as a liquid (resin) reservoir, and a reduced pressure suction pipe can be inserted into the through-hole of the resin discharging end to connect the inside of the recess portion to a reduced-pressure suction apparatus. It is also possible that the through-hole on the resin intruding end side is coupled to an injection pipe of the core forming curable resin to inject the resin with pressure.

The preferable characteristics of the mold forming curable resin are as follows: The cured substance can easily be peeled off from the master plate. The mold forming curable resin has predetermined mechanical strength and size stability as the mold (repeatedly used). The mold forming curable resin has hardness for maintaining the recess portion shape. The mold forming curable resin has the good adhesion properties to the cladding substrate. Various chemical additives can be added to the mold forming curable resin as needed.

In the uncured state, the mold forming curable resin can be applied to or injected into the surface of the master plate. Since the projection portion corresponding to the individual optical waveguide core portion formed in the master plate is accurately copied, it is preferable that the mold forming curable resin has an appropriate viscosity, e.g., the mold forming curable resin ranges from about 500 to about 7000 mPa·s. The mold forming curable resin used in the invention shall include the resin, which becomes the rubber member having elasticity after the curing. Sometimes a solvent for adjusting the viscosity is added to an extent in which the solvent does not affect other members.

From the viewpoints of peeling properties, mechanical strength, size stability, hardness, and adhesive properties to the cladding substrate, hardening organopolysiloxane which becomes silicone rubber (silicone elastomer) or silicone resin is preferably used as the mold forming curable resin. In the hardening organopolysiloxane, it is preferable that a methyl polysiloxane group, an ethyl polysiloxane group, and a phenyl polysiloxane group are included in a molecule. A one-component type and a two-component type, which is used in combination with a curing agent, can be used as the hardening organopolysiloxane. A thermo-setting type and a room-temperature curing type (for example, cured by moisture in air) can be used as the hardening organopolysiloxane, and other curing methods such as ultraviolet curing also can be used.

The hardening organopolysiloxane, which becomes the rubber state after the hardening is preferably used, and the hardening organopolysiloxane called liquid silicone rubber (term of "liquid" includes high-viscosity substance such as paste substance) is usually used. The two-component type hardening organopolysiloxane used in combination with the curing agent is preferably used. Among others, in the addition type liquid silicone rubber, the surface and the inside are uniformly cured in a short period of time, and by-product is not generated or is hardly generated. The addition type liquid silicone rubber also has mold releasing properties and a small shrinkage factor. Therefore, the addition type liquid silicone rubber is preferably used.

In the liquid silicone rubber, particularly liquid polydimethylsiloxane (PDMS) rubber is preferable from the viewpoint of control of adhesion properties, peeling properties, strength, and hardness. The cured substance of liquid polydimethylsiloxane rubber generally has the low refractive index of about 1.43, the curable resin layer which is of the mold made of polydimethylsiloxane rubber can directly utilized as the upper cladding layer without peeling off the curable resin layer from the cladding substrate. In this case, a device is required such that the curable resin layer is not peeled from the filled core forming curable resin and cladding substrate.

From the perspective that the projection portion corresponding to the optical waveguide core portion is accurately copied, from the perspective that air inclusion is decreased to facilitate degassing, and from the perspective that the mold is formed with the thickness of several millimeters, it is preferable that the viscosity of the liquid silicone rubber ranges from about 500 to about 7000 mPa·s, and it is more preferable that the viscosity ranges from about 2000 to about 5000 mPa·s.

The hardness of the mold 310 including the curable resin layer preferably ranges from 10 to 50 in Shore A hardness. The use of the curable resin layer having the soft rubber characteristics enables the mold releasing properties to be improved after the core portion formation to impart the accurate core forming ability. A proper value can be selected as the thickness of the curable resin layer such that the molding accuracy can be kept against vibration and pressure change in injecting the core forming curable resin. The hardness of the mold 310 (Shore A hardness) can be measured with a durometer in conformity with JIS K 6253.

From the viewpoints of adhesion properties to the cladding substrate and penetrating speed of the core forming curable resin, it is preferable that surface energy of the mold 310 including the curable resin layer ranges from 7 to 30 mN/m, and it is more preferable that the surface energy of the mold 310 ranges from 12 to 21 mN/m. In the invention, the surface energy is measured by a technique of computing critical surface tension using a Zisman method.

It is preferable that arithmetic mean roughness Ra of the recess portion of the mold 310 including the curable resin layer is not more than 0.1 μm, and it is more preferable that arithmetic mean roughness Ra is not more than 0.05 μm. The surface roughness of the recess portion is controlled within the above range, which allows the light loss to be largely decreased in the optical waveguide properties of the formed core portion. In the invention, the arithmetic mean roughness Ra can be measured pursuant to JIS (B 0601).

(Process of Bringing Mold into Close Contact with Cladding Substrate)

In the invention, the silicon substrate or an electronic circuit board is used as the cladding substrate. A silicon wafer, a glass substrate, a ceramic substrate, a plastic substrate, and the like can be used as the cladding substrate with no restriction.

The substrate having the proper refractive index can directly be used as the cladding substrate. When the refractive index control is required, the cladding substrate is fully or partially coated with the resin or the inorganic material as the cladding layer by a PVD (Physical Vapor Deposition) method. In the invention, the cladding substrate shall include the substrate in which the cladding layer is provided.

In the invention, it is necessary that the refractive index of the cladding substrate (or cladding layer) is smaller than that of the waveguide core by not less than 0.01. The refractive indexes of the substrates or the layers can be measured with a prism coupler, an ellipsometer, or an Abbe refractive index meter (the refractive index of other core portions and the like can also be measured in the same way).

With reference to the preferable properties of the cladding substrate, the arithmetic mean roughness Ra is not more than 0.1 μm, the adhesion properties to the mold (curable resin layer) is excellent, and a cavity except for the recess portion of the mold is not generated when the cladding substrate comes into close contact with the mold. When the cladding substrate does not have the good adhesion properties to the mold and/or the core portion, it is preferable that the adhesion properties to the mold and/or the core portion is improved by performing a process in an ozone atmosphere and an ultraviolet irradiation process with wavelengths not more than 300 nm.

The optical waveguide in which a flexible film substrate in the plastic substrates is used as the cladding substrate can be used as a coupler, an optical interconnection between boards, an optical demultiplexer and the like. The film substrate is selected according to the application of the polymer optical waveguide to be prepared in consideration of the refractive index, optical properties such as light transmission properties, the mechanical properties, the surface smoothness, heat-resistant properties, the adhesion properties to the mold, flexibility, and the like.

Examples of the film substrate material include acrylic resin (polymethyl methacrylate and the like), cycloaliphatic acrylic resin, styrene resin (polystyrene, acrylonitrile-styrene copolymer, and the like), olefin resin (polyethylene, polypropylene, ethylene-propylene copolymer, and the like), cycloaliphatic olefin resin, vinyl chloride resin, vinylidene chloride resin, vinyl alcohol resin, vinyl butyral resin, acrylate resin, fluorine-containing resin, polyester resin (polyethylene terephthalate, polyethylene naphthalate, and the like), polycarbonate resin, cellulose diacetate or cellulose triacetate, amide resin (aliphatic polyamide, aromatic polyamide, and the like), imide resin, sulfone resin, polyether sulfone resin, polyetheretherketone resin, polyphenylene sulfide resin, polyoxymethylene resin, and a blend thereof.

Examples of the cycloaliphatic olefin resin include the cycloaliphatic acrylic resin having a norbornene structure in a main chain and the cycloaliphatic acrylic resin having the norbornene structure in the main chain and a polar group such as an alkyl oxycarbonyl group (alkyl group has a carbon number ranging from 1 to 6 and cycloalkyl group) in a side chain. Among others, the cycloaliphatic olefin resin having the norbornene structure in the main chain and the polar group such as an alkyl oxycarbonyl group in the side chain has the low refractive index (the refractive index is around 1.50 and the refractive index difference between the core and the cladding can be secured) and the excellent optical properties such as the high light transmission, and the cycloaliphatic olefin resin having the norbornene structure in the main chain and the polar group in the side chain has the excellent adhesion properties to the mold and the excellent heat-resistant properties. Therefore, the cycloaliphatic olefin resin having the norbornene structure in the main chain and the polar group in the side chain is suitable to the preparation of the polymer optical waveguide.

The thickness of the film substrate is properly selected in consideration of the flexibility, rigidity, the ease of handling, and the like. Usually it is preferable that the thickness of the film substrate ranges from 0.03 mm to 0.5 mm. In the surface smoothness of the used film substrate, it is preferable that the arithmetic mean roughness Ra is not more than 10 μm, it is more preferable that the arithmetic mean roughness Ra is not more than 1 μm, and it is particularly preferable that the arithmetic mean roughness Ra is not more than 0.1 μm.

(Process of Causing Core Forming Curable Resin to Intrude into Mold)

In order to cause the core forming curable resin into the recess portion of the mold, the cladding substrate having one size larger than the mold is brought into close contact with the mold, and a little amount of core forming curable resin is caused to drop into the resin intruding end of the recess portion to fill the recess portion by utilizing the capillarity, the resin intruding end of the recess portion is filled with the core forming curable resin by the pressurizing, the resin discharging end of the recess portion is sucked at the reduced pressure, or both the pressurizing filling and the reduced-pressure suction are performed.

FIG. 4C shows the state in which the core forming curable resin intrudes into the waveguide core recess portion using the mold made of the PDMS rubber. Referring to FIG. 4C, in the mold 310 brought in close contact with the a film substrate 410 which is of the cladding substrate, the through-holes 362 and 364 are filled with the core forming curable resins having the different refractive indexes respectively, and the core forming curable resins are cause to proceed to the main waveguide core recess portion 322 and the sub-waveguide core recess portion 324 from the two resin intruding ends on the left side of FIG. 4C at one time by performing the suction at the reduced pressure from the through-holes 382 and 384.

In this case, particularly for the sub-waveguide core recess portion 324, it is necessary to perform the suction from the side of the communication passage 326 (air vent passage recess portion 326). The shape accuracy that the output light beam of the light emitting device does not leak is required at the leading end on the main waveguide side of the finally formed sub-waveguide core. Accordingly, the suction port such as the communication passage 326 (air vent passage recess portion 326) shown in FIG. 4 is provided at the leading end (resin discharging end), and preferably only an extremely small part of the communication passage 326 is filled with the resin even if the resin reaches the leading end.

Thus, the thin communication passage 326 is provided at the resin discharging end on the leading end of the sub-waveguide core recess portion 324 and the sub-waveguide core is formed by performing the suction, which results in the shape defect is slightly generated in the portion where the leading end of the sub-waveguide core intersects the communication passage (see FIG. 4D). However, since the size of the shape defect can be formed not more than 10 μm, the shape defect does not become the large loss factor. It is preferable that the width of the communication passage 326 is not more than 0.5 $D_2$ where $D_2$ is the width of the sub-waveguide core.

A radiation curable resin, an electron-beam curable resin, the thermo-setting resin, and the like can be used as the core forming curable resin. Among others, the ultraviolet curable resin and the thermo-setting resin are preferably used. Ultraviolet curing or thermo-setting monomer, oligomer, and mixture of monomer and oligomer are preferably used as the ultraviolet curable resin and the thermo-setting resin. Particularly the mixture of oligomer is useful for aid of a curing rate and the improvement of the shape accuracy. Epoxy resin, polyimide resin, and acrylic resin are preferably used as the ultraviolet curable resin.

It is necessary that the core forming curable resin have the sufficiently low viscosity so as to be able to intrude into the cavity (recess portion of mold) formed between the mold and the cladding substrate. From the viewpoints of filling speed, good core shape, and little optical loss, during uncuring, it is preferable that the viscosity of the core forming curable resin ranges from 50 mPa·s to 2000 mPa·s, it is more preferable that the viscosity ranges from 100 mPa·s to 1000 mPa·s, and it is particularly preferable that the viscosity ranges from 300 mPa·s to 700 mPa·s.

In addition, in order to accurately reproduce the original shape possessed by the projection portion corresponding to the waveguide core formed in the master plate, it is necessary that a volume change of the core forming curable resin is small before and after the curing. For example, when the volume is decreased, the waveguide loss is increased. Therefore, it is desirable that the volume change is as small as possible in the core forming curable resin. It is desirable that the volume change is not more than 10%, and it is more desirable that the volume change ranges from 0.01% to 4%. It is preferable to avoid lowering the viscosity with the solvent, because the volume change is large before and after the curing.

In order to decrease the volume change (shrinkage) after the core forming curable resin is cured, polymer can be added to the core forming curable resin. It is preferable that the polymer has compatibility with the core forming curable resin and does not affect the refractive index of the core forming curable resin, an elastic modulus, and the transmission properties. The addition of polymer enables not only the small volume change but also high-accuracy control of the viscosity and a glass transition point of the core forming curable resin. By way of example only, acrylic polymer, methacrylic acid polymer, and epoxy polymer can be used as the polymer added to the core forming curable resin.

The refractive index of the cured substance of the core forming curable resin preferably ranges from 1.20 to 1.60, and more preferably ranges from 1.4 to 1.6. In the invention, it is necessary that the refractive index of the sub-waveguide core is set not more than the refractive index of the main waveguide core.

It is necessary that the refractive index of the cured substance of the core forming curable resin is larger than that of the cladding substrate (or cladding layer and cladding portion). The refractive index difference between the core and the cladding substrate depend on the multi-mode waveguide or the single-mode waveguide. In the case of the multi-mode waveguide, the refractive index difference is not less than 0.01, preferably not less than 0.02. In the case of the main waveguide core connected to the optical fiber, it is desirable that the refractive index difference between the core and the cladding is set so as to be matched with the aperture number of the optical fiber.

In the process of causing the core forming curable resin to intrude into the mold, in order to promote the filling of the mold recess portion with the core forming curable resin by the capillarity, it is desirable to reduce the pressure of the whole system (range of about −0.1 to about −100 kPa for normal pressure). In addition of the reduced pressure of the system, that the viscosity is further lowered by heating the core forming curable resin inputted from the intruding port of the mold is the effective measure in order to promote the filling.

(Process of Curing Intruded Core Forming Curable Resin)

In this process, the intruded core forming curable resin is cured by various means. An ultraviolet lamp, an ultraviolet LED, a UV radiation apparatus, and the like are used in order to cure the ultraviolet curable resin. In order to cure the thermosetting resin, heating the thermosetting resin in an oven or the like is also the effective Means for accelerating the curing.

The following processes can be provided as needed in the Invention.

(Process of Peeling Mold from Cladding Substrate)

In this process, the mold is peeled from the cladding substrate after the process of curing the core forming curable resin. As described above, the curable resin layer, which is of the mold used in each process, can directly be used as the upper cladding layer when the conditions such as the refractive index are satisfied. In this case, it is not necessary that the mold is not peeled off, and the mold is directly utilized as the upper cladding layer. In this case, in order to improve the adhesion properties between the mold and the waveguide core, it is preferable that the ozone process is performed to the mold.

In the invention, from the viewpoint of the cost reduction, it is preferable that the mold is repeatedly used, so that this process and the process of forming the upper cladding layer are usually performed.

FIG. 4D shows a plan view of the cladding substrate in which the waveguide core is formed with the mold peeled. As shown in FIG. 4D, a main waveguide core 16 and a sub-waveguide core 56 are formed on a film substrate 410 while brought close to each other through a cladding portion 42. Resin portions 17 and 57 cured in the through-holes remain in the end portions of the main waveguide core 16 and the sub-waveguide core 56 respectively. As described above, the shape defect (projection portion) shown in the enlarged view is slightly observed at the leading end on the main waveguide side of the sub-waveguide core.

(Process of Forming Upper Cladding Layer on Cladding Substrate in which Core Portion is Formed)

In this process, the upper cladding layer is formed on the cladding substrate in which the waveguide core is formed. A film (for example, the material of the cladding substrate is similarly used), a layer in which a cladding forming curable resin is applied and cured, and a polymer film obtained by applying a polymer material solution can be cited as an example of the upper cladding layer. The ultraviolet curable resin and the thermosetting resin are preferably used as the cladding forming curable resin. For example, the ultraviolet curing or thermo-setting monomer, oligomer, and mixture of monomer and oligomer are used.

In order to decrease the volume change (shrinkage) after the cladding forming curable resin is cured, it is possible to add polymer (for example, methacrylic acid polymer and epoxy polymer) which has compatibility with the core forming curable resin and does not affect the refractive index of the core forming curable resin, the elastic modulus, and the transmission properties to the cladding forming curable resin.

In the case where the film is used as the upper cladding layer, the film is bonded by a bonding agent. At this point, it is desirable that the refractive index of the bonding agent is close to that of the film. The ultraviolet curable resin and the thermo-setting resin are preferably used as the bonding agent. For example, the ultraviolet curing or thermo-setting monomer, oligomer, and mixture of monomer and oligomer are used. In order to decrease the volume change (shrinkage) after the ultraviolet curable resin or the thermo-setting resin is cured, it is possible to add polymer which is similar to the polymer added to the upper cladding layer.

In the invention, as shown in FIG. 4D, the main waveguide core 16 and the sub-waveguide core 56 are brought close to each other, and the cladding portion 42 provided between the main inclined plane and the sub-inclined plane can simultaneously be filled with the curable resin in forming the upper cladding layer.

It is preferable that the refractive index difference is as small as possible between the cladding substrate and the upper cladding layer. The refractive index difference is preferably not more than 0.1, more preferably not more than 0.05, and particularly preferably is not more than 0.001. From the viewpoint of light confinement, it is most preferable that the refractive index difference is eliminated.

In the above-described production of the optical waveguide, in the combination of the use of the liquid silicone resin cured in the rubber member, particularly the liquid polydimethylsiloxane solution as the mold forming curable resin and the use of the cycloaliphatic acrylic resin having the norbornene structure in the main chain and the polar group such as the alkyl oxycarbonyl group in the side chain as the cladding substrate, the adhesion properties is particularly high between the mold forming curable resin and the cladding substrate, no deformation is generated in the mold recess portion structure, and the recess portion can rapidly be filled with the curable resin even if a cross-sectional area of the recess portion structure is extremely small (for example, 10 μm by 10 μm rectangle)

Finally, as shown in FIG. 4E, the resin portions 17 and 57 cured in the through-holes are cut with the dicing saw or the like, a post-bending main waveguide core end portion 34 and a sub-waveguide core end portion 58 are formed, and a pre-bending main waveguide core end portion 24 is formed to produce the optical waveguide 120. Each core end surface of the end portion formed by the cutting has mirror surface smoothness.

(Bidirectional Communication Optical Waveguide Equipped with Monitor)

Figure 9:
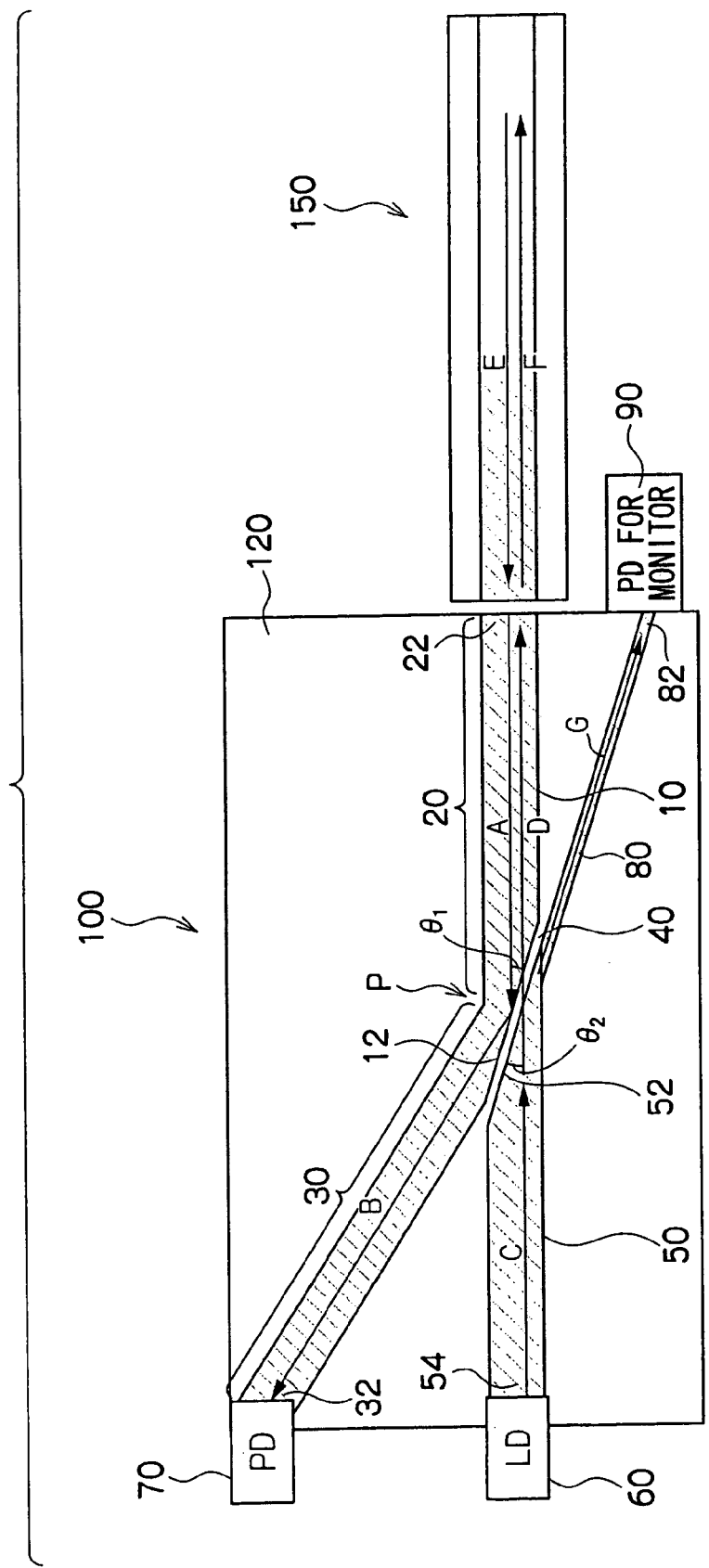
FIG. 9 is a schematic view showing a bidirectional communication optical waveguide (with monitor waveguide) according to the invention.

In addition to the above basic configuration, in the invention, it is also possible to add a monitor waveguide for guiding a monitor light beam in order to monitor the output of the light emitting device. FIG. 9 shows a bidirectional communication optical waveguide equipped with a monitor.

As shown in FIG. 9, a bidirectional communication optical waveguide 100A includes the main waveguide core 10, the sub-waveguide core 50, and a monitor waveguide core 80 on the surface of the cladding substrate 120. The main waveguide core 10 has the bent portion P in the midway of the optical path, the sub-waveguide core 50 is brought close to the main waveguide core 10 through the cladding portion 40, and the monitor waveguide core 80 is continuously connected to the leading end portion on the side of the cladding portion 40 of the sub-waveguide core 50.

The monitor waveguide core 80 extending from the sub-waveguide has a monitor waveguide core end portion 82 connected to a monitor light receiving device 90. The end surface of the monitor waveguide core end portion 82 is exposed to the side on which the optical fiber 150 is connected. A part of the output light beam outputted from the light emitting device 60 propagates through the monitor waveguide core 80 in an arrow G direction, and the part of the output light beam is guided to the monitor light receiving device 90. The monitor waveguide core 80 has the linear waveguide core (hereinafter referred to as "linear portion") whose side surface on the side of the main waveguide core 10 is continuously connected to the sub-inclined plane 52.

Figure 10:
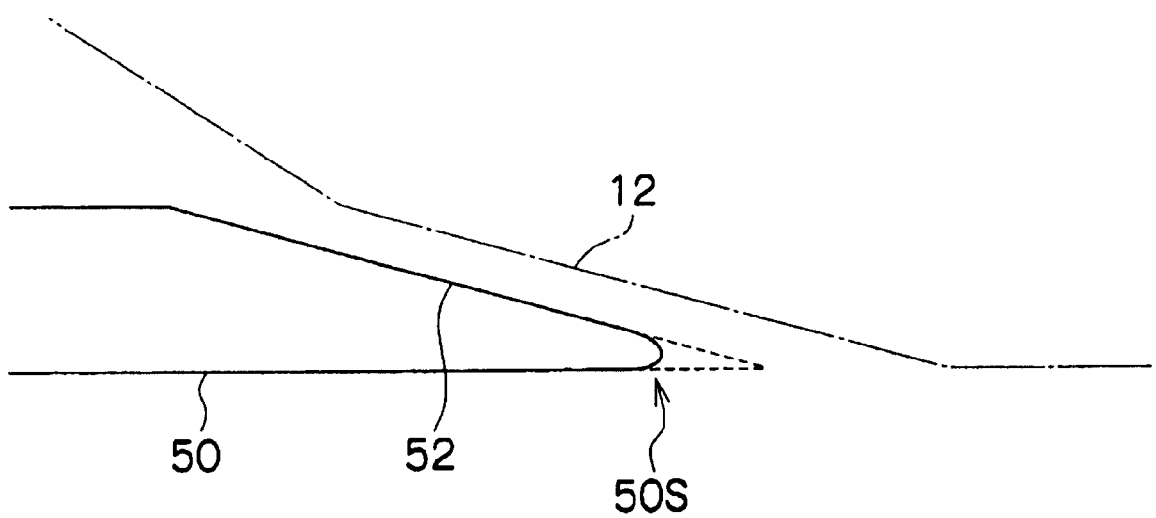
FIG. 10 shows a shape of a leading edge of a sub-waveguide core.

In the case where the monitor waveguide core 80 is not provided, as shown by a dotted line of FIG. 10, because the shape of a leading end portion 50S of the sub-waveguide core 50 is formed in an acute angle, it is actually difficult to prepare the ideal shape. For example, in the case where the waveguide shape is prepared by a direct exposure method, the minimum width of the leading end portion 50S is substantially one-tenth of the film thickness, and the acute shape shown by the solid line cannot faithfully be prepared. Thus, the obtuse shape of the leading end portion 50S of the sub-waveguide core 50 generates a scattering component at the leading end portion 50S. That is, a part of the output light beam is scattered at the leading end portion 50S of the sub-waveguide core 50.

Figure 11:
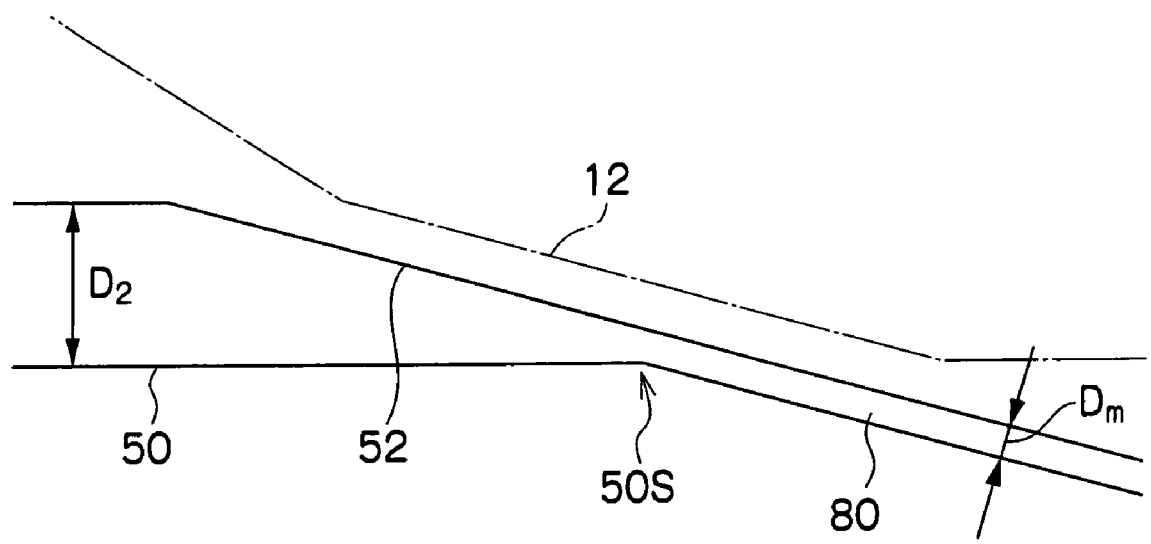
FIG. 11 shows a coupling portion between the sub-waveguide core and a monitor waveguide core.

In the invention, as shown in FIG. 11, the preparation of the acute shape is avoided by extending the sub-inclined plane 52 to the leading end portion 50S of the sub-waveguide core 50 to form the monitor waveguide core 80.

In the configuration of the invention, the scattering component is directly guided to the monitor waveguide core 80 and effectively utilized as the monitor light.

A ratio of the output light beam guided to the monitor waveguide core 80 is proportional to the width of the monitor waveguide core 80, so that monitor light intensity can be controlled by controlling the width of the monitor waveguide core 80.

However, from the viewpoint of waveguide preparing process, it is obvious that the optical waveguide is easily prepared as the width Dm of the monitor waveguide core 80 is increased. Therefore, in the invention, it is found that the optical waveguide can easily be produced while the loss is suppressed at the minimum when the following expression (6) is satisfied:

$$0.1D_2 \leq D_m \leq D_2 \qquad (6)$$

where $D_m$ is the width of the monitor waveguide core 80 and $D_2$ is the width of sub-waveguide core 50.

According to the above configuration, the output light beam intensity of the light emitting device 60 can be monitored by the monitor light receiving device 90 to perform feedback control of the light emitting device 60. The decrease in coupling efficiency of the sub-waveguide core 50 to the main waveguide 10 can be minimized by providing the monitor waveguide core 80 at the leading end of the sub-waveguide core 50.

Figure 12:
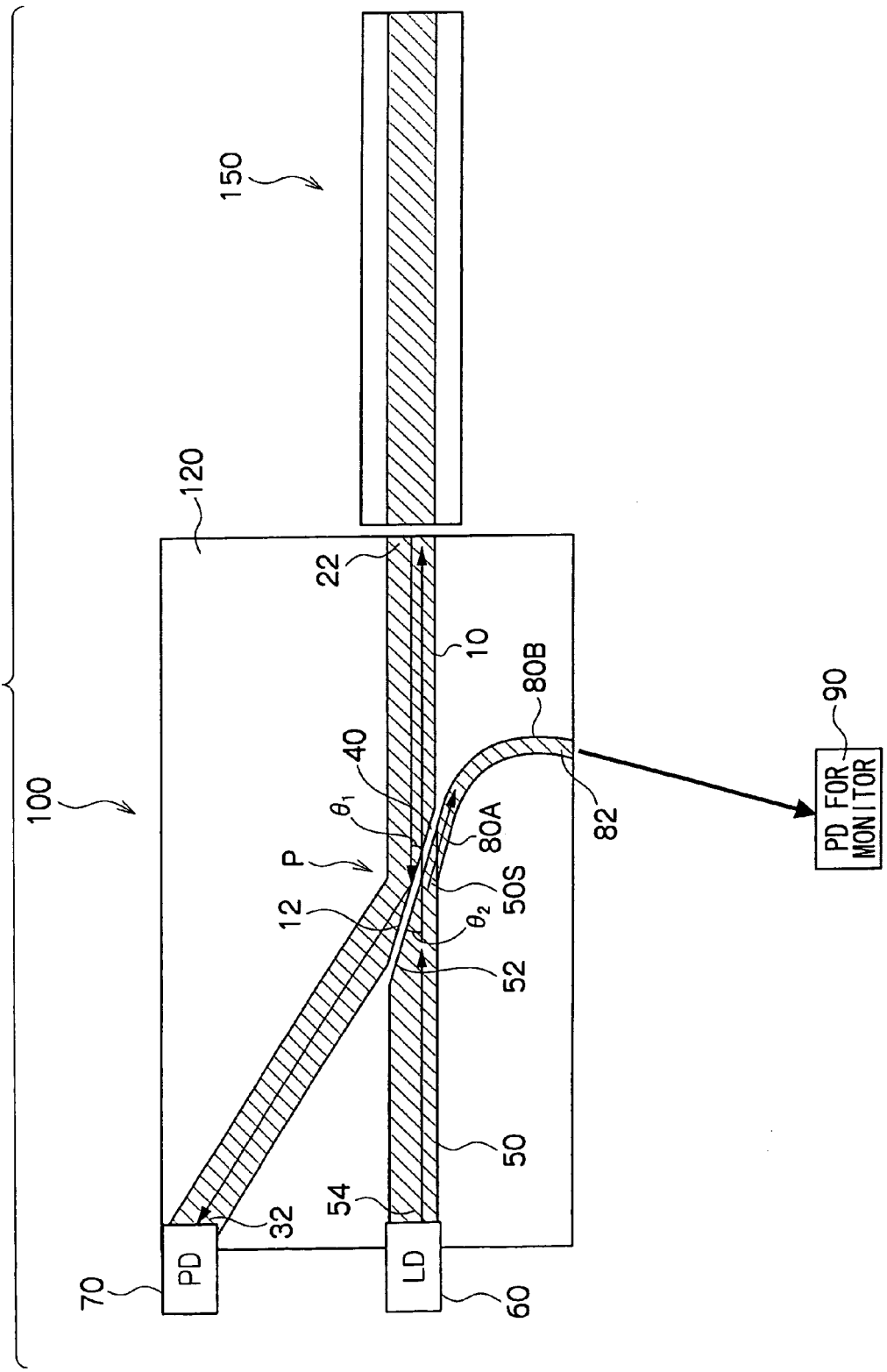
FIG. 12 is a schematic view showing a bidirectional communication optical waveguide with the monitor waveguide.
Figure 13:
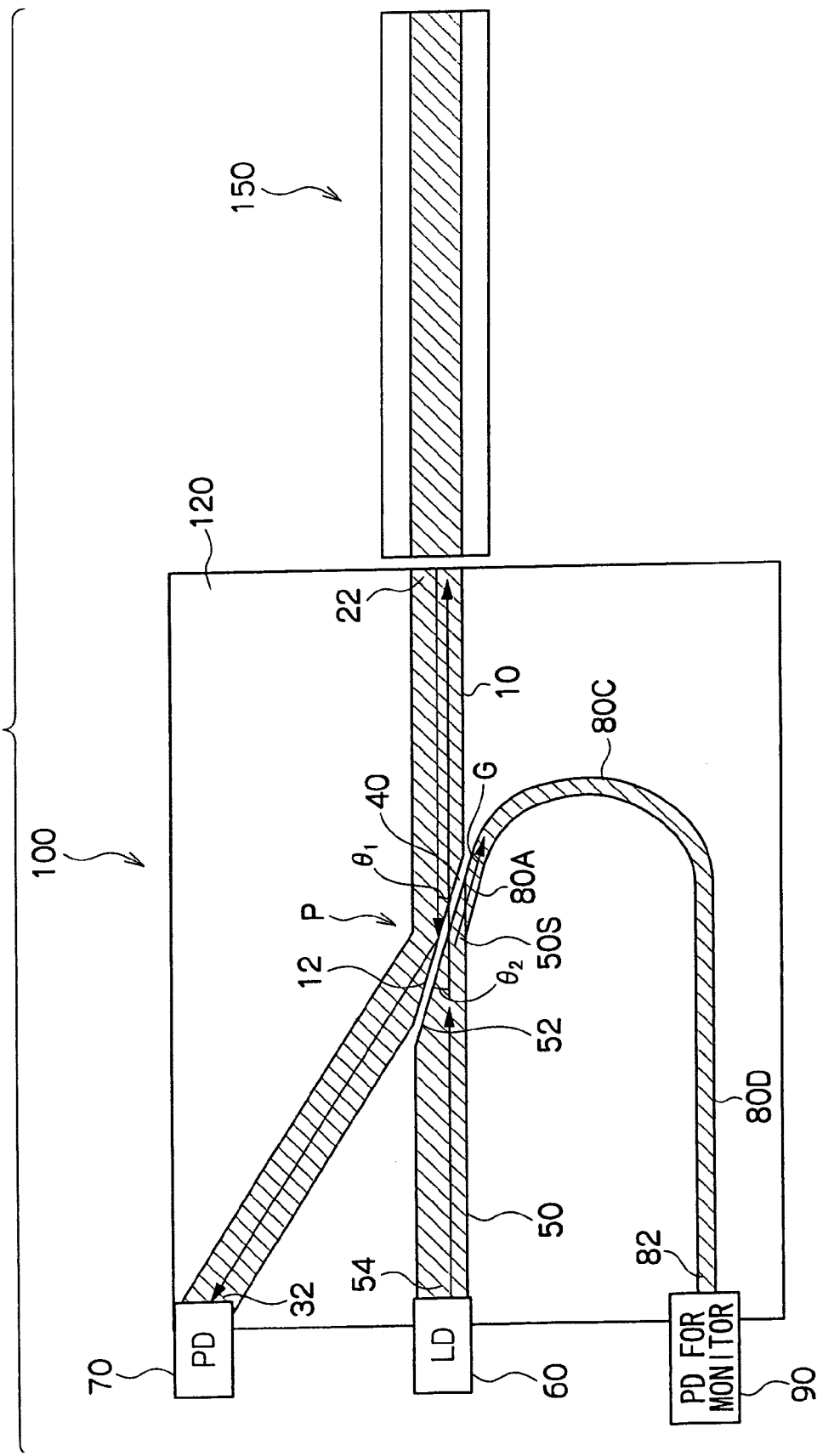
FIG. 13 is a schematic view showing a bidirectional communication optical waveguide with the monitor waveguide.
Figure 14:
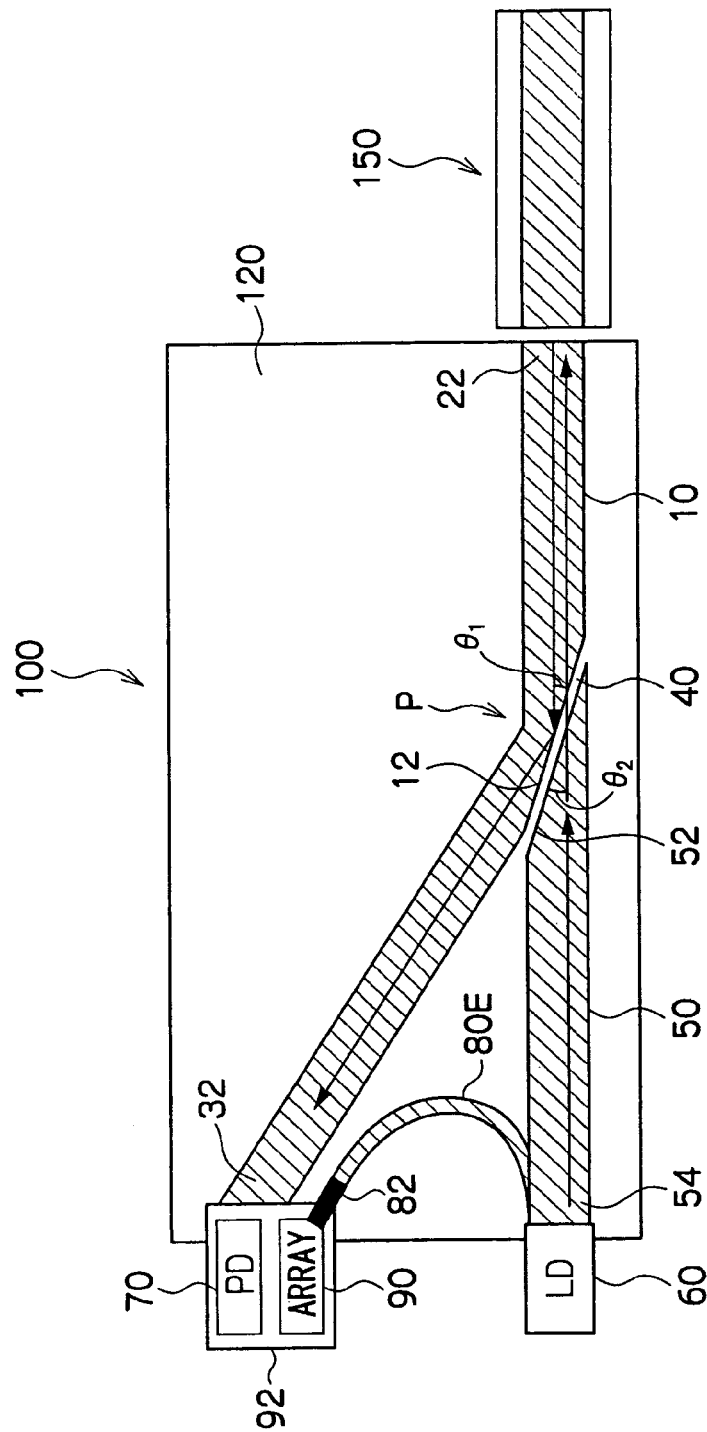
FIG. 14 is a schematic view showing a bidirectional communication optical waveguide with the monitor waveguide.

FIGS. 12 to 14 show other configurations of the bidirectional communication optical waveguide equipped with the monitor. As shown in FIGS. 12 to 14, the waveguide (hereinafter referred to as "curved portion") formed in the curved shape can be provided in the monitor waveguide core 80. The position of the monitor light receiving device 90 can arbitrarily set by introducing the curved portion.

In this case, the waveguide is formed in the curve shape which recedes from the pre-bending main waveguide end portion 22 for inputting and outputting the bidirectional light signal from and to the optical fiber, which allows the placement of the monitor light receiving device 90 to be facilitated. A curvature radius of the curved portion is changed depending on the refractive index and the width of the monitor waveguide core. It is preferable the curvature radius is substantially not less than 2 mm, and it is more preferable the curvature radius is not less than 3 mm. Bending loss of the waveguide light can be suppressed by forming the curvature radius not less than 2 mm.

The monitor light receiving device 90 can obtain the maximum light receiving sensitivity by directly bonding the monitor light receiving device 90 to the monitor light outgoing position. In the case where the monitor light receiving device 90 is placed on an extension in the monitor light outgoing direction, the monitor light receiving device 90 can also function as the monitor of the light emitting device 60 while the light receiving sensitivity is degraded. In this case, placing position tolerance of the monitor light receiving device 90 can be released.

In the optical waveguide shown in FIG. 12, the monitor waveguide core 80 includes a liner portion 80A and a curved portion 80B. The liner portion 80A is continuously connected to the leading end portion 50S of the sub-waveguide core 50 and the curved portion 80B is continuously connected to the liner portion 80A. The end surface of the monitor waveguide core end portion 82 is exposed to the side surface side parallel to the light propagating direction of the cladding substrate 120. The monitor light receiving device 90 is arranged while separated from the monitor waveguide core end portion 82. The same component as the configuration shown in FIG. 1 is designated by the same numeral, and the description will be omitted.

In this configuration, a part of the output light beam outputted from the light emitting device 60 propagates through the monitor waveguide cores 80A and 80B, and the part of the output light beam is radiated from the monitor waveguide core end portion 82. The monitor light receiving device 90 receives the radiated light from the monitor waveguide core end portion 82. A degree of freedom of placing the monitor light receiving device 90 can be increased to release the position tolerance by introducing the curved portion into the optical waveguide.

In the optical waveguide shown in FIG. 13, the monitor waveguide core 80 includes the linear portion 80A, a semicircular curved portion 80C, and a linear portion 80D. The liner portion 80A is continuously connected to the leading end portion 50S of the sub-waveguide core 50, the curved portion 80C is continuously connected to the liner portion 80A, and the liner portion 80D is continuously connected to the curved portion 80C. The end surface of the monitor waveguide core end portion 82 is exposed to the light emitting device 60 and the side on which the light receiving device 70 is arranged. The same component as the configuration shown in FIG. 1 is designated by the same numeral, and the description will be omitted.

In this configuration, a part of the output light beam outputted from the light emitting device 60 propagates through the monitor waveguide cores 80A, 80C, and 80D, and the part of the output light beam is guided to the monitor light receiving device 90. The light emitting device and the light receiving device can be arranged at the same end of the optical waveguide by introducing the semicircular curved portion into the optical waveguide. This arrangement enables the optical path to be bent at 90° only by forming one end of the optical waveguide at 45°, which facilitates the connection to a surface emitting laser or a photodiode. Therefore, all the devices can be mounted on a surface.

In the above description, the monitor waveguide core is continuously connected to the leading end portion of the sub-waveguide core. Since the monitor waveguide core is continuously connected to the sub-waveguide core, it is also possible that the monitor waveguide core is branched in the midway of the sub-waveguide core 50 as shown in FIG. 14.

The optical waveguide shown in FIG. 14 includes a semicircular monitor waveguide core 80E which is branched in the midway of the sub-waveguide core 50. The end surface of the monitor waveguide core end portion 82 is exposed to the side on which the light emitting device 60 and the light receiving device 70 are arranged. The monitor light receiving device 90 is arranged on a substrate 92 along with the light receiving device 70. The same component as the configuration shown in FIG. 1 is designated by the same numeral, and the description will be omitted.

In this configuration, a part of the output light beam outputted from the light emitting device 60 propagates through the monitor waveguide core 80E, and the part of the output light beam is guided to the monitor light receiving device 90. The monitor light receiving device 90 can be arranged at the light receiving device 70 by introducing the semicircular curved portion into the optical waveguide. For example, the light receiving device 70 and the monitor light receiving device 90 can be arrayed in two channels to reduce the mounting cost of the light receiving device.

EXAMPLES

Hereinbelow, the invention will specifically described by showing examples. However, the invention is not limited to the examples.

Example 1

(Bidirectional Communication Optical Waveguide Preparation)

As shown in FIG. 2, a bidirectional communication optical waveguide having the whole length of 4 mm and the width of 2 mm is prepared. In Example 1, the main inclined plane and the sub-inclined plane are substantially parallel to each other.

Mold Preparation

After a thick resist (trade mane: SU-8, manufactured by Micro Chemical) is applied to the silicon substrate 202 shown in FIG. 4A by a spin coating method, pre-baking is performed at 80° C., the exposure is performed through a photomask, and development is performed to form the bidirectional communication optical waveguide. The obtained bidirectional communication optical waveguide includes the main waveguide core projection portion 222 (width $D_1$: 50 μm and height: 50 μm), the sub-waveguide core projection portion 224 (width $D_2$: 50 μm and height: 50 μm), and the air vent (communication passage) projection portion 226 (width: 20 μm and height: 50 μm). The air vent (communication passage) projection portion 226 is connected at a right angle to the leading end on the main waveguide core side of the of the sub-waveguide core projection portion 224. Post-baking is performed at 120° C. to prepare the master plate 210 for preparing the optical waveguide core.

The angle θ formed between the linear direction (optical axis) in the sub-waveguide core projection portion and the plane corresponding to the sub-inclined plane is set at 9°, and the sub-inclined plane is arranged so as to be brought close to main inclined plane of bent portion side surface of the main waveguide core projection portion, in which angle θ becomes the tangent. At this point, the distance $D_c$ between the tangent in the center of the plane corresponding to the main inclined plane and the plane corresponding to the sub-inclined plane is 20 μm.

Then, after the mold releasing agent is applied to the master plate 210, a thermo-setting dimethyl siloxane resin (trade name: SYLGARD 184, manufactured by Dow Corning Asia) and a curing agent thereof are caused to flow into the master plate 210, and the thermo-setting dimethyl siloxane resin and the curing agent are cured by the heating at 120° C. for 30 min. After the curing, the cured resin layer is peeled to prepare the mold (thickness: 5 mm) having the recess portions corresponding to the main waveguide core, the sub-waveguide core, and the air vent hole.

As shown in FIG. 4B, the through-holes 362 and 382 having the diameters of 3 mm are made in the mold such that the both ends of the main waveguide core recess portion 322 are exposed. Similarly the through-holes 364 and 384 are made at the end portion on the side in which the sub-inclined plane does not exist of the sub-waveguide core recess portion 324 and the end portion of the air vent passage recess portion (communication passage) 326. Therefore, the resin input end and the resin output end for the core forming curable resin are made to form the mold 310.

Waveguide Core and Upper Cladding Layer Formation

As shown in FIG. 4C, the mold 310 and the film substrate 410 (trade name: ARTON, manufactured by JSR Corporation, refractive index of 1.510) having the thickness of 188 μm are brought in close contact with each other. Then, the through-hole 362 made in the main waveguide core recess portion 322 of the mold 310 is sufficiently filled with the ultraviolet curable resin (refractive index of 1.535 after the curing) having the viscosity of 800 mPa·s, and a diaphragm suction pump (maximum suction pressure: −33.25 kPa) is used to perform the suction at suction force of −20 kPa from the through-hole 382 located on the opposite side to the through-hole 362, which fills the main waveguide core recess portion 322 with the ultraviolet curable resin.

At the same time, the through-hole 364 made in the main waveguide core recess portion 324 of the mold 310 is sufficiently filled with the ultraviolet curable resin having the viscosity of 1700 mPa·s (refractive index of 1.52 after the curing), and the diaphragm suction pump (maximum suction pressure: −33.25 kPa) is used to perform the suction at suction force of −20 kPa from the through-hole 384 coupled to the air vent passage (communication passage) recess portion 326, which fills the sub-waveguide core recess portion 324 with the ultraviolet curable resin except for the air vent hole. In this case, the filling time is about 20 sec.

The UV light having the light intensity of 50 mW/cm² is radiated for 5 min from the ARTON film side to cure the ultraviolet curable resin, and the mold is released. Another ARTON film is prepared as the upper cladding layer, and the bonding is performed such that the waveguide core is sandwiched using the ultraviolet curable resin having the refractive index of 1.510. At this point, a gap portion between the main waveguide core and the sub-waveguide core is sufficiently filled with the bonding agent.

Then, the UV light having the light intensity of 50 mW/cm² is radiated for 5 min to perform the curing, and finally the waveguide film end portions are cut with the dicing saw to obtain the bidirectional communication optical waveguide shown in FIG. 4E.

Table 1 shows the configuration and characteristics of the optical waveguide.

In the bidirectional communication optical waveguide prepared in the above-described way, although the unnecessary 10 μm curved plane is added to the linear portion which forms the angle $θ_2$ with the sub-inclined plane, the large loss does not exist, and the good performance is able to be exerted as shown in Example 1.

(Bidirectional Communication Optical Waveguide Evaluation)

As shown in FIG. 1, the bidirectional optical input and output is performed by bringing the communication optical fiber 150 close to the pre-bending main waveguide core end portion 22 of the prepared bidirectional communication optical waveguide. The communication optical fiber 150 is the GI type multi-mode optical fiber, the core diameter is 62.5 μm, and the numerical aperture NAf is 0.275.

For the bidirectional communication device, VCSEL (trade name: AM-0001, manufactured by Fuji Xerox Co., Ltd.) having a light emitting wavelength of 850 nm which is of the light emitting device 60 (LD) is attached to the sub-waveguide core end portion 54 by an optical bonding agent, and the photodetector (PD) which is of the light receiving device 70 is attached to the post-bending main waveguide core end portion 32 by the optical bonding agent. In this case, the input and output light beams from the optical fibers are measured by bringing a measurement optical fiber close to the waveguide for the purpose of the loss evaluation. In the measurement, matching oil is used between the optical fiber 150 and the waveguide, and the output light beam wavelength from the optical fiber 150 is set at 850 nm.

Table 2 shows the optical loss when the bidirectional light input and output is performed on the above conditions. With reference to loss P in Table 2, the waveguide core end portion (pre-bending main waveguide core end portion) on the communication optical fiber side is indicated by a suffix 1, the waveguide core end portion (sub-waveguide core end portion) on the light emitting device side is indicated by a suffix 2, and the waveguide core end portion (post-bending main waveguide core end portion) on the light receiving device side is indicated by a suffix 3. In "Pxy", the light beam input position is indicated by x, the light beam output position is indicated by y, and the input and output are indicated by these suffixes. The optical loss is indicated in terms of dB (the attenuation is increased as the number is increased).

Examples 2 to 7 and Comparative Examples 1 to 3

Similarly to Example 1, the bidirectional communication optical waveguides are prepared and evaluated. However, the optical waveguides differ from that of Example 1 in that the width ($D_2$) of the sub-waveguide core, the width ($D_c$) of the cladding portion, and the refractive indexes ($n_1$ and $n_2$) of the main waveguide core and the sub-waveguide core are changed as shown in Table 1.

Table 2 shows the evaluation results.

TABLE 1

| | $D_1$ (μm) | $D_2$ (μm) | $D_c$ (μm) | $n_1$ | $n_2$ | $n_0$ | $\theta_1$ (deg) | $\theta_2$ (deg) |
|---|---|---|---|---|---|---|---|---|
| Example 1 | 50 | 50 | 10 | 1.535 | 1.52 | 1.51 | 7 | 9 |
| Example 2 | 50 | 50 | 10 | 1.535 | 1.52 | 1.51 | 8 | 8 |
| Example 3 | 50 | 50 | 20 | 1.535 | 1.52 | 1.51 | 7 | 9 |
| Example 4 | 50 | 50 | 50 | 1.535 | 1.52 | 1.51 | 7 | 9 |
| Example 5 | 50 | 50 | 10 | 1.535 | 1.52 | 1.51 | 6 | 9 |
| Example 6 | 50 | 30 | 10 | 1.535 | 1.52 | 1.51 | 7 | 9 |
| Example 7 | 50 | 50 | 5 | 1.57 | 1.53 | 1.51 | 12 | 12 |
| Comparative Example 1 | 50 | 25 | 0 | 1.535 | 1.535 | 1.51 | 7 | 9 |
| Comparative Example 2 | 50 | 50 | 20 | 1.535 | 1.535 | 1.51 | 7 | 9 |
| Comparative Example 3 | 50 | 50 | 20 | 1.52 | 1.52 | 1.51 | 7 | 9 |

TABLE 2

| | $P_{11}$ (dB) | $P_{12}$ (dB) | $P_{13}$ (dB) | $P_{21}$ (dB) | $P_{22}$ (dB) | $P_{23}$ (dB) |
|---|---|---|---|---|---|---|
| Example 1 | 40 | 20 | 0.5 | 2.5 | 40 | 40 |
| Example 2 | 40 | 20 | 0.4 | 2 | 40 | 40 |
| Example 3 | 40 | 22 | 0.6 | 1.8 | 40 | 40 |
| Example 4 | 40 | 25 | 0.6 | 2.5 | 40 | 40 |
| Example 5 | 40 | 20 | 1 | 2.5 | 40 | 40 |
| Example 6 | 40 | 22 | 0.6 | 1.1 | 40 | 40 |
| Example 7 | 40 | 30 | 1 | 2 | 40 | 40 |
| Comparative Example 1 | 40 | 5 | 2.5 | 1.2 | 40 | 40 |
| Comparative Example 2 | 40 | 20 | 0.6 | 35 | 40 | 40 |
| Comparative Example 3 | 40 | 2 | 10 | 1.2 | 40 | 40 |

As can be seen from the results shown in Table 2, in Examples 1 to 7 in which the bidirectional communication optical waveguides of the invention are used, a stray light component P23 reaching the adjacent light receiving device (PD) side from the light emitting device (LD) side, a feedback light component P22 to the light emitting device (LD) of itself, a stray light component P12 reaching to the light emitting device (LD) side of the input light beam, and a feedback light component P11 to the communication optical fiber have the numerical values not lower than constant values, and the stray light and the feedback light exist in the low level, so that there is no fear that malfunction is generated in the light emitting device and the light receiving device. Further, both P21 indicating the loss from the light emitting device to the communication optical fiber and P13 indicating the loss from the communication optical fiber to the light receiving device are small, so that it is found that the transmission and reception can be performed with small loss.

On the other hand, in Comparative Example 1 in which the main waveguide core and the sub-waveguide core are directly coupled to each other and the refractive indexes thereof are similar to each other, even if the core diameter of the sub-waveguide core is decreased, it cannot be avoided that the stray light which destabilizes the output of the light emitting device intrudes from the communication optical fiber. This phenomenon is also observed in JP-A 11-271548 which is of the related art.

In Comparative Example 2 in which the main waveguide core and the sub-waveguide core are separated from each other, when the refractive indexes of the both cores are equal to each other, the total reflection of the light beam from the light emitting device is generated by the sub-inclined plane, and the light beam does not reach the communication optical fiber. In Comparative Example 3, because the input light beam component from the communication optical fiber is hardly reflected by the main inclined plane, the input light beam does not reach the light receiving device, and the input light beam intrudes into the light emitting device side in the form of the stray light to destabilize the output of the light emitting device.

Example 8

(Bidirectional Communication Optical Waveguide Preparation)

As shown in FIG. 7, a bidirectional communication optical waveguide having the whole length of 10 mm and the width of 3 mm is prepared. In Example 8, the inclined angle of the sub-inclined plane is larger than that of the main inclined plane, and the main inclined plane and the sub-inclined plane are not parallel to each other.

Mold Preparation

After the thick resist (trade mane: SU-8, manufactured by Micro Chemical) is applied to the silicon substrate 202 shown in FIG. 4A by a spin coating method, pre-baking is performed at 80° C., the exposure is performed through a photomask, and development is performed to form the bidirectional communication optical waveguide. The obtained bidirectional communication optical waveguide includes the main waveguide core projection portion 222 (width $D_1$: 50 μm and height: 50 μm), the sub-waveguide core projection portion 224 (width $D_2$: 50 μm and height: 50 μm), and the air vent (communication passage) projection portion 226 (width: 20 μm and height: 50 μm). The air vent (communication passage) projection portion 226 is connected at a right angle to the leading end on the main waveguide core side of the sub-waveguide core projection portion 224. Post-baking is performed at 120° C. to obtain the master plate 210 for preparing the optical waveguide core.

The angle $\theta_1$ formed between the linear direction (optical axis) in the main waveguide core projection portion 222 and the plane corresponding to the main inclined plane is set at 8°, and the angle $\theta_2$ formed between the linear direction (optical axis) in the sub-waveguide core projection portion 224 and the plane corresponding to the sub-inclined plane is set at 12°. The main waveguide core projection portion 222 is bent such that the angle formed between the linear direction (optical axis) of the pre-bending main waveguide core projection portion and the linear direction (optical axis) of the post-bending main waveguide core projection portion is set at 16°.

The pre-bending main waveguide core projection portion and the post-bending main waveguide core projection portion are brought close to each other such that the distance $D_c$ between the main inclined plane in the main waveguide core and the sub-inclined plane in the sub-waveguide core is set to 10 µm. At this point, the sub-waveguide core projection portion 224 and the pre-bending portion of the main waveguide core projection portion 222 are linearly aligned with each other.

Then, after the mold releasing agent is applied to the master plate 210, the thermo-setting dimethyl siloxane resin (trade name: SYLGARD184, manufactured by Dow Corning Asia) and the curing agent thereof are caused to flow into the master plate 210, and the thermo-setting dimethyl siloxane resin and the curing agent are cured by the heating at 120° C. for 30 min. After the curing, the cured resin layer is peeled to prepare the mold (thickness: 5 mm) having the recess portions corresponding to the main waveguide core, the sub-waveguide core, and the air vent hole.

As shown in FIG. 4B, the through-holes 362 and 382 having the diameters of 3 mm are made in the mold such that the both ends of the main waveguide core recess portion 322 are exposed. Similarly the through-holes 364 and 384 are made at the end portion on the side in which the sub-inclined plane does not exist of the sub-waveguide core recess portion 324 and the end portion of the air vent passage recess portion (communication passage) 326. Therefore, the resin input end and the resin output end for the core forming curable resin are made to form the mold 310.

Waveguide Core and Upper Cladding Layer Formation

As shown in FIG. 4C, the mold 310 and the film substrate 410 (trade name: ARTON, manufactured by JSR Corporation, refractive index of 1.510) having the thickness of 188 µm are brought in close contact with each other. Then, the through-hole 362 made in the main waveguide core recess portion 322 of the mold 310 is sufficiently filled with the ultraviolet curable resin (manufactured by JSR Corporation, refractive index of 1.53 after the curing) having the viscosity of 800 mPa·s, and a diaphragm suction pump (maximum suction pressure: −33.25 kPa) is used to perform the suction at suction force of −20 kPa from the through-hole 382 located on the opposite side to the through-hole 362, which fills the main waveguide core recess portion 322 with the ultraviolet curable resin.

At the same time, the through-hole 364 made in the main waveguide core recess portion 324 of the mold 310 is sufficiently filled with the ultraviolet curable resin having the viscosity of 800 mPa·s (manufactured by JSR Corporation, refractive index of 1.53 after the curing), and the diaphragm suction pump (maximum suction pressure: −33.25 kPa) is used to perform the suction at suction force of −20 kPa from the through-hole 384 coupled to the air vent passage recess portion 326, which fills the sub-waveguide core recess portion 324 with the ultraviolet curable resin except for the air vent hole. In this case, the filling time is about 20 sec.

The UV light having the light intensity of 50 mW/cm² is radiated for 5 min from the ARTON film side to cure the ultraviolet curable resin, and the mold is released. Another ARTON film is prepared as the upper cladding layer, and the bonding is performed such that the waveguide core is sandwiched using the ultraviolet curable resin having the refractive index of 1.510. At this point, a gap portion between the main waveguide core and the sub-waveguide core is sufficiently filled with the bonding agent.

Then, the UV light having the light intensity of 50 mW/cm² is radiated for 5 min to perform the curing, and finally the waveguide film end portions are cut with the dicing saw to obtain the bidirectional communication optical waveguide shown in FIG. 4E. Table 3 shows the configuration and characteristics of the optical waveguide according to Example 1. In Table 3, $n_1$ is the refractive indexes of the main waveguide core and the sub-waveguide core, $n_0$ is the refractive index of the cladding portion, and N is the number of steps in the sub-inclined plane.

In the bidirectional communication optical waveguide prepared in the above-described way, although the unnecessary 10 µm curved plane is added to the linear portion which forms the angle $\theta_2$ with the sub-inclined plane, the large loss does not exist, and the good performance is able to be exerted as shown in Table 4.

Example 9

In Example 9, the bidirectional communication optical waveguide having the configuration in which one step is formed in the sub-inclined plane is prepared as shown in FIG. 8A. Similarly to Example 1, the angle $\theta_2$ in the inclined portion of the sub-inclined plane is set at 12°. The landing portion of the sub-inclined plane is prepared so as to equally divide the sub-waveguide core into two in the width direction. The main inclined plane in the main waveguide core and the sub-inclined plane in the sub-waveguide core are brought closest to each other at the corner portion of the landing portion of the sub-inclined plane, and the distance $D_c$ is 10 µm. The bidirectional communication optical waveguide according to Example 9 is prepared in the same way as Example 8 except that the step is formed in the sub-inclined plane. Table 3 shows the configuration and characteristics of the optical waveguide of Example 9. In the bidirectional communication optical waveguide of Example 9, the large loss does not exist, and the good performance is able to be exerted as shown in Table 4.

Example 10

Figure 8B:
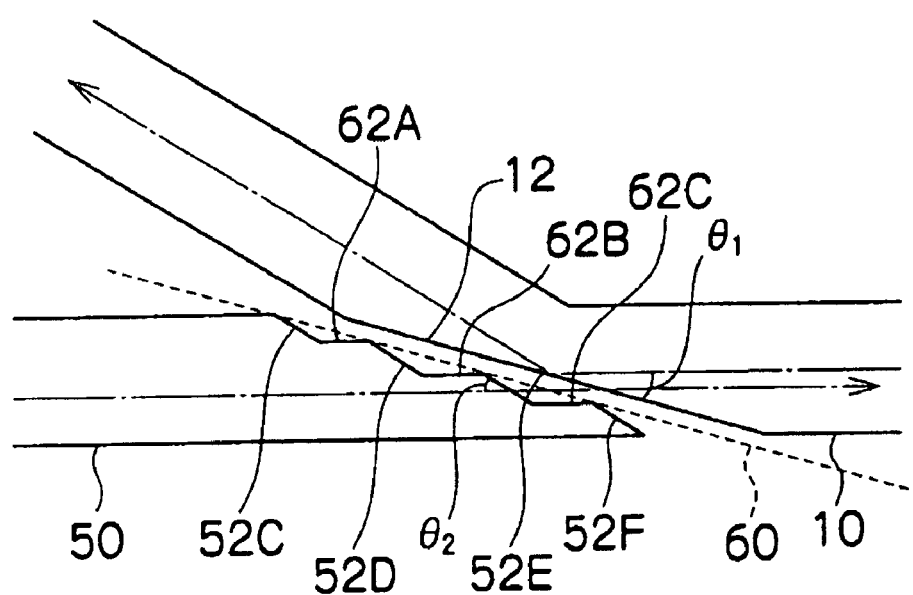

In Example 10, the bidirectional communication optical waveguide having the configuration in which three steps are formed in the sub-inclined plane is prepared as shown in FIG. 8B. Similarly to Example 1, the angle $\theta_2$ in the inclined portion of the sub-inclined plane is set at 12°. The landing portion of the sub-inclined plane is prepared at three portions so as to equally divide the sub-waveguide core into four in the width direction. The main inclined plane in the main waveguide core and the sub-inclined plane in the sub-waveguide core are brought closest to each other at the corner portions of the landing portions of the sub-inclined plane, and the distance $D_c$ is 10 µm. The bidirectional communication optical waveguide according to Example 10 is prepared in the same way as Example 8 except that the steps are formed in the sub-inclined plane. Table 3 shows the configuration and characteristics of the optical waveguide of Example 10. In the bidirectional communication optical waveguide of Example 10, the large loss does not exist, and the good performance is able to be exerted as shown in Table 4.

Example 11

A bidirectional communication optical waveguide according to Example 11 is prepared in the same way as Example 8. However, the optical waveguide of Example 11 differs from the optical waveguide of Example 8 in that the width $D_2$ of the sub-waveguide core is set at 25 μm, the angle $\theta_1$ is set at 10°, the angle $\theta_2$ is set at 15°, and the ultraviole curable resin (refractive index after the curing: 1.55) having the viscosity of 700 mPa·s is used as the sub-waveguide core. Table 3 shows the configuration and characteristics of the optical waveguide of Example 11. In the bidirectional communication optical waveguide of Example 11, the large loss does not exist, and the good performance is able to be exerted as shown in Table 4.

Comparative Example 4

The bidirectional communication optical waveguide according to Comparative Example 4 is prepared in the same way as Example 8 except that the optical waveguide is formed such that the main waveguide core and the sub-waveguide core are partially connected to each other. Table 3 shows the configuration and characteristics of the optical waveguide of Comparative Example 4. Since the main waveguide core and the sub-waveguide core are partially connected to each other, the distance $D_c$ is 0 μm.

Comparative Example 5

The bidirectional communication optical waveguide according to Comparative Example 5 is prepared in the same way as Example 8 except that the angle $\theta_1$ is set at 8° and the angle $\theta_2$ is also set at 8°. Table 3 shows the configuration and characteristics of the optical waveguide of Comparative Example 5.

Comparative Example 6

The bidirectional communication optical waveguide according to Comparative Example 6 is prepared in the same way as Example 1. However, the optical waveguide of Comparative Example 6 differs from the optical waveguide of Example 1 in that the angle $\theta_1$ is set at 12°, and the angle $\theta_2$ is also set at 12°, and the ultraviolet curable resin (refractive index after the curing: 1.55) having the viscosity of 700 mPa·s is used as the sub-waveguide core. Table 3 shows the configuration and characteristics of the optical waveguide of Comparative Example 6.

TABLE 3

|  | $D_1$ (μm) | $D_2$ (μm) | $D_c$ (μm) | N | $n_1$ | $n_0$ | $\theta_1$ (deg) | $\theta_2$ (deg) |
|---|---|---|---|---|---|---|---|---|
| Example 8 | 50 | 50 | 10 | 0 | 1.53 | 1.51 | 8 | 12 |
| Example 9 | 50 | 50 | 10 | 1 | 1.53 | 1.51 | 8 | 12 |
| Example 10 | 50 | 50 | 10 | 3 | 1.53 | 1.51 | 8 | 12 |
| Example 11 | 50 | 25 | 10 | 0 | 1.55 | 1.51 | 10 | 15 |
| Comparative Example 4 | 50 | 50 | 0 | 0 | 1.53 | 1.51 | 8 | 12 |
| Comparative Example 5 | 50 | 50 | 10 | 0 | 1.53 | 1.51 | 8 | 8 |
| Comparative Example 6 | 50 | 50 | 10 | 0 | 1.53 | 1.51 | 12 | 12 |

(Bidirectional Communication Optical Waveguide Evaluation)

As shown in FIG. 1, the bidirectional optical input and output is performed by bringing the communication optical fiber 150 close to the pre-bending main waveguide core end portion 22 of the bidirectional communication optical waveguide prepared in Examples 8 to 11 and Comparative Examples 4 to 6. The communication optical fiber 150 is the GI type multi-mode optical fiber, the core diameter is 62.5 μm, and the numerical aperture NAf is 0.275.

For the bidirectional communication device, VCSEL (trade name: AM-0001, manufactured by Fuji Xerox Co., Ltd.) having the light emitting wavelength of 850 nm which is of the light emitting device (LD) is attached to the sub-waveguide core end portion 54 by the optical bonding agent, and the photodetector (PD) is attached to the post-bending main waveguide core end portion 32 by the optical bonding agent. In this case, the input and output light beams from the optical fibers are measured by bringing the measurement optical fiber close to the waveguide for the purpose of the loss evaluation. In the measurement, the matching oil is used between the optical fiber 150 and the waveguide, and the output light beam wavelength from the optical fiber 150 is set at 850 nm.

Table 4 shows the optical loss when the bidirectional light input and output is performed on the above conditions. With reference to loss P in Table 4, the waveguide core end portion (pre-bending main waveguide core end portion) on the communication optical fiber side is indicated by the suffix 1, the waveguide core end portion (sub-waveguide core end portion) on the light emitting device side is indicated by the suffix 2, and the waveguide core end portion (post-bending main waveguide core end portion) on the light receiving device side is indicated by the suffix 3. In "Pxy", the light beam input position is indicated by x, the light beam output position is indicated by y, and the input and output are indicated by these suffixes. The optical loss is indicated in terms of dB (the attenuation is increased as the number is increased).

TABLE 4

|  | $P_{11}$ (dB) | $P_{12}$ (dB) | $P_{13}$ (dB) | $P_{21}$ (dB) | $P_{22}$ (dB) | $P_{23}$ (dB) |
|---|---|---|---|---|---|---|
| Example 8 | 40 | 20 | 1 | 4 | 40 | 40 |
| Example 9 | 40 | 20 | 1 | 3.5 | 40 | 40 |
| Example 10 | 40 | 20 | 1 | 3 | 40 | 40 |
| Example 11 | 40 | 10 | 1 | 3.3 | 40 | 40 |

As can be seen from the results shown in Table 4, in Examples 8 to 11 in which the bidirectional communication optical waveguides of the invention are used, the stray light component P23 reaching the adjacent light receiving device (PD) side from the light emitting device (LD) side, the feedback light component P22 to the light emitting device (LD) of itself, the stray light component P12 reaching to the light emitting device (LD) side of the input light beam, and the feedback light component P11 to the communication optical fiber have the numerical values not lower than constant values, and the stray light and the feedback light exist in the low level, so that there is no fear that malfunction is generated in the light emitting device and the light receiving device. Further, both P21 indicating the loss from the light emitting device to the communication optical fiber and P13 indicating the loss from the communication optical fiber to the light receiving device are extremely small, so that it is found that the transmission and reception can be performed with small loss.

On the other hand, in Comparative Example 4 in which the main waveguide core and the sub-waveguide core are directly coupled to each other ($D_c$=0), even if the core diameter of the sub-waveguide core is decreased, it cannot be avoided that the stray light which destabilizes the output of the light emitting device intrudes from the communication optical fiber. This phenomenon is also observed in JP-A 11-271548, which is of the related art.

In Comparative Example 5 in which the main waveguide core and the sub-waveguide core are separated from each other, when not only the refractive indexes of the both cores are equal to each other but also the inclined angle of the sub-inclined plane and the inclined angle of the main inclined plane are equal to each other, the total reflection of the light beam from the light emitting device is generated by the sub-inclined plane, and the light beam does not reach the communication optical fiber. In Comparative Example 6, because the input light beam component from the communication optical fiber is hardly reflected by the main inclined plane, the input light beam does not reach the light receiving device, and the input light beam intrudes into the light emitting device side in the form of the stray light to destabilize the output of the light emitting device.

Example 12

(Bidirectional Communication Optical Waveguide Preparation)

As shown in FIG. 9, a bidirectional communication optical waveguide having the whole length of 10 mm and the width of 5 mm is prepared. In Example 12, the monitor waveguide core is extended from the leading end of the sub-waveguide core to the waveguide end portion, and the monitor light is able to be received by the light receiving device.

Mold Preparation

After the thick resist (trade mane: SU-8, manufactured by Micro Chemical) is applied to the silicon substrate 202 shown in FIG. 15A by the spin coating method, the pre-baking is performed at 80° C., the exposure is performed through the photomask, and the development is performed to form the bidirectional communication optical waveguide. The obtained bidirectional communication optical waveguide includes the main waveguide core projection portion 222 (width $D_1$: 50 μm and height: 50 μm), the sub-waveguide core projection portion 224 (width $D_2$: 50 μm and height: 50 μm), and the monitor waveguide core projection portion 226 (width: 20 μm and height: 50 μm). The monitor waveguide core projection portion 226 is connected at a right angle to the leading end on the main waveguide core side of the sub-waveguide core projection portion 224. The post-baking is performed at 120° C. to obtain the master plate 210 for preparing the optical waveguide core.

The angle $\theta_1$ formed between the linear direction (optical axis) in the main waveguide core projection portion 222 and the plane corresponding to the main inclined plane is set at 12°, and the angle $\theta_2$ formed between the linear direction (optical axis) in the sub-waveguide core projection portion 224 and the plane corresponding to the sub-inclined plane is set at 12°. The main waveguide core projection portion 222 is bent such that the angle formed between the linear direction (optical axis) of the pre-bending main waveguide core projection portion and the linear direction (optical axis) of the post-bending main waveguide core projection portion is set at 24°.

The pre-bending main waveguide core projection portion and the post-bending main waveguide core projection portion are brought close to each other such that the distance $D_c$ between the main inclined plane in the main waveguide core and the sub-inclined plane in the sub-waveguide core is set to 10 μm. At this point, the sub-waveguide core projection portion 224 and the pre-bending portion of the main waveguide core projection portion 222 are linearly aligned with each other.

Then, after the mold releasing agent is applied to the master plate 210, the thermo-setting dimethyl siloxane resin (trade name: SYLGARD184, manufactured by Dow Corning Asia) and the curing agent thereof are caused to flow into the master plate 210, and the thermo-setting dimethyl siloxane resin and the curing agent are cured by the heating at 120° C. for 30 min. After the curing, the cured resin layer is peeled to prepare the mold (thickness: 5 mm) having the recess portions corresponding to the main waveguide core, the sub-waveguide core, and the monitor waveguide core.

As shown in FIG. 15B, the through-holes 362 and 382 having the diameters of 3 mm are made in the mold such that the both ends of the main waveguide core recess portion 322 are exposed. Similarly the through-holes 364 and 384 are made at the end portion on the side in which the sub-inclined plane does not exist of the sub-waveguide core recess portion 324 and the end portion of the air vent passage recess portion (communication passage) 326. Therefore, the resin input end and the resin output end for the core forming curable resin are made to form the mold 310.

Waveguide Core and Upper Cladding Layer Formation

As shown in FIG. 15C, the mold 310 and the film substrate 410 (trade name: ARTON, manufactured by JSR Corporation, refractive index of 1.510) having the thickness of 188 μm are brought in close contact with each other. Then, the through-hole 362 made in the main waveguide core recess portion 322 of the mold 310 is sufficiently filled with the ultraviolet curable resin (manufactured by JSR Corporation, refractive index of 1.57 after the curing) having the viscosity of 800 mPa·s, and the diaphragm suction pump (maximum suction pressure: −33.25 kPa) is used to perform the suction at suction force of −20 kPa from the through-hole 382 located on the opposite side to the through-hole 362, which fills the main waveguide core recess portion 322 with the ultraviolet curable resin.

At the same time, the through-hole 364 made in the main waveguide core recess portion 324 of the mold 310 is sufficiently filled with the ultraviolet curable resin having the viscosity of 800 mPa·s (manufactured by JSR Corporation, refractive index of 1.53 after the curing), and the diaphragm suction pump (maximum suction pressure: −33.25 kPa) is used to perform the suction at suction force of −20 kPa from the through-hole 384 coupled to the air vent passage recess portion 326, which fills the sub-waveguide core recess portion 324 with the ultraviolet curable resin except for the air vent hole. In this case, the filling time is about 20 sec.

The UV light having the light intensity of 50 mW/cm² is radiated for 5 min from the ARTON film side to cure the ultraviolet curable resin, and the mold is released. Another ARTON film is prepared as the upper cladding layer, and the bonding is performed such that the waveguide core is sandwiched using the ultraviolet curable resin having the refractive index of 1.510. At this point, the gap portion between the main waveguide core and the sub-waveguide core is sufficiently filled with the bonding agent.

Then, the UV light having the light intensity of 50 mW/cm² is radiated for 5 min to perform the curing, and finally the waveguide film end portions are cut with the dicing saw to obtain the bidirectional communication optical waveguide shown in FIG. 15E. Table 5 shows the configuration and characteristics of the optical waveguide according to Example 12. In Table 5, $n_1$ is the refractive indexes of the main waveguide core and the sub-waveguide core and $n_0$ is the refractive index of the cladding portion.

In the bidirectional communication optical waveguide prepared in the above-described way, the large loss does not exist, and the good performance is able to be exerted as shown in Table 6.

Examples 13 to 17

Bidirectional communication optical waveguides according to Examples 13 to 17 are prepared in the same way as Example 12 except that the configurations and characteristics of the optical waveguide are changed as shown in Table 5. In the optical waveguides of Example 13 to 17, the large loss does not exist, and the good performance is able to be exerted as shown in Table 6.

Comparative Example 7

A bidirectional communication optical waveguide according to Comparative Example 7 is prepared in the same way as Example 12 except that the monitor waveguide is not provided. When the optical waveguide in which the monitor waveguide is not provided is prepared by the direct exposure, the leading end shape of the sub-inclined plane having the 50-μm-by-50-μm rectangle core becomes the arc defect shape having the diameter of 10 μm.

portion (pre-bending main waveguide core end portion) on the communication optical fiber side is indicated by the suffix 1, the waveguide core end portion (sub-waveguide core end portion) on the light emitting device side is indicated by the suffix 2, the waveguide core end portion (post-bending main waveguide core end portion) on the light receiving device side is indicated by the suffix 3, and the monitor waveguide end portion is indicated by a suffix 4. In "Pxy", the light beam input position is indicated by x, the light beam output position is indicated by y, and the input and output are indicated by these suffixes. The optical loss is indicated in terms of dB (the attenuation is increased as the number is increased).

TABLE 6

|  | $P_{11}$ (dB) | $P_{12}$ (dB) | $P_{13}$ (dB) | $P_{21}$ (dB) | $P_{22}$ (dB) | $P_{23}$ (dB) | $P_{24}$ (dB) |
| --- | --- | --- | --- | --- | --- | --- | --- |
| Example 12 | 40 | 20 | 0.9 | 2.7 | 40 | 40 | 9 |
| Example 13 | 40 | 20 | 0.8 | 2.5 | 40 | 40 | 10 |
| Example 14 | 40 | 25 | 0.6 | 3.2 | 40 | 40 | 9 |
| Example 15 | 40 | 30 | 0.5 | 4.2 | 40 | 40 | 9 |
| Example 16 | 40 | 30 | 1.2 | 4.2 | 40 | 40 | 9 |
| Example 17 | 40 | 20 | 0.7 | 2.7 | 40 | 40 | 9 |
| Comparative Example 7 | 40 | 30 | 1.2 | 4.2 | 40 | 40 | 9 |

TABLE 5

|  | $D_1$ (μm) | $D_2$ (μm) | $D_m$ (μm) | $D_c$ (μm) | $n_1$ | $n_2$ | $n_0$ | $θ_1$ (deg) | $θ_2$ (deg) |
| --- | --- | --- | --- | --- | --- | --- | --- | --- | --- |
| Example 12 | 50 | 50 | 15 | 10 | 1.57 | 1.53 | 1.51 | 12 | 12 |
| Example 13 | 50 | 50 | 15 | 10 | 1.57 | 1.53 | 1.51 | 10 | 10 |
| Example 14 | 50 | 50 | 15 | 20 | 1.57 | 1.53 | 1.51 | 12 | 12 |
| Example 15 | 50 | 50 | 15 | 40 | 1.57 | 1.53 | 1.51 | 12 | 12 |
| Example 16 | 50 | 50 | 15 | 10 | 1.53 | 1.53 | 1.51 | 8 | 12 |
| Example 17 | 50 | 50 | 15 | 10 | 1.59 | 1.53 | 1.51 | 14 | 14 |
| Comparative Example 7 | 50 | 50 | 15 | 10 | 1.53 | 1.53 | 1.51 | 8 | 12 |

(Bidirectional Communication Optical Waveguide Evaluation)

As shown in FIG. 9, the bidirectional optical input and output is performed by bringing the communication optical fiber 150 close to the pre-bending main waveguide core end portion 22 of the bidirectional communication optical waveguide prepared in Examples 12 to 17 and Comparative Example 7. The communication optical fiber 150 is the GI type multi-mode optical fiber, the core diameter is 62.5 μm, and the numerical aperture NAf is 0.275.

For the bidirectional communication device, VCSEL (trade name: AM-0001, manufactured by Fuji Xerox Co., Ltd.) having the light emitting wavelength of 850 nm which is of the light emitting device (LD) is attached to the sub-waveguide core end portion 54 by the optical bonding agent, and the photodetector (PD) is attached to the post-bending main waveguide core end portion 32 by the optical bonding agent. In this case, the input and output light beams from the optical fibers are measured by bringing the measurement optical fiber close to the waveguide for the purpose of the loss evaluation. In the measurement, the matching oil is used between the optical fiber 150 and the waveguide, and the output light beam wavelength from the optical fiber 150 is set at 850 nm.

Table 6 shows the optical loss when the bidirectional light input and output is performed on the above conditions. With reference to loss P in Table 6, the waveguide core end As can be seen from the results shown in Table 6, in Examples 12 to 17 in which the bidirectional communication optical waveguides of the invention are used, the stray light component P23 reaching the adjacent light receiving device (PD) side from the light emitting device (LD) side, the feedback light component P22 to the light emitting device (LD) of itself, the stray light component P12 reaching to the light emitting device (LD) side of the input light beam, and the feedback light component P11 to the communication optical fiber have the numerical values not lower than constant values, and the stray light and the feedback light exist in the low level, so that there is no fear that malfunction is generated in the light emitting device and the light receiving device. Further, both P21 indicating the loss from the light emitting device to the communication optical fiber and P13 indicating the loss from the communication optical fiber to the light receiving device are extremely small, so that it is found that the transmission and reception can be performed with small loss.

When compared with the configuration in which the monitor waveguide is not provided (Comparative Example 7), the coupling loss from the light emitting device to the main waveguide is not worsened although the monitor waveguide is provided. The value of P24 indicating the loss in the monitor waveguide is extremely small, and the light beam can be guided to the monitor light receiving device with sufficient sensitivity. Further, feedback control can be performed to an output fluctuation of the light emitting device according to temperature rise based on the monitor result, and the stable communication can be realized.

On the other hand, in Comparative Example 7 in which the monitor waveguide is not provided, the leading end shape of the sub-inclined plane is the arc defect shape having the diameter of 10 μm, and the coupling efficiency to the main waveguide is decreased. Since the feedback control to the light emitting device is hardly performed, the output is fluctuated as the temperature is increased.

Example 18

As shown in FIG. 9, the monitor waveguide core having the width of 20 μm is extended from the leading end of the sub-waveguide of Example 1 to the waveguide end portion, and the monitor light is able to be received by the light receiving device. In this case, the monitor light is able to be received with loss of 9 dB while the values such as the coupling loss shown in Example 1 are not changed. Therefore, the temperature feedback to the light emitting device is able to be easily performed. In the same configuration, when the monitor light outgoing position is kept away from the optical fiber by bending the monitor waveguide with the curvature radius of 2 mm, the monitor light is able to be received with loss of 11 dB. Therefore, the degree of freedom of arranging the light receiving device is able to be increased.

As shown in FIG. 14, it is obvious that the light receiving device is formed in the two-array shape and the monitor light can be guided to the two-array light receiving device. However, in this case, the coupling loss from the light emitting device to the optical fiber is slightly increased.

In the bidirectional communication optical waveguide of the invention, the main waveguide core and the sub-waveguide core are brought close to each other at the bent portion, the main inclined plane and the sub-inclined plane face each other which sandwiching the cladding portion, and the following expressions (1), (2), and (3) are satisfied:

$$\sin\theta_1/((n_1^2-n_0^2)^{1/2}/n_1)<1 \quad (1)$$

$$\sin\theta_2/((n_2^2-n_0^2)^{1/2}/n_2)>1 \quad (2)$$

$$\sin(\beta-\theta_1)/((n_1^2-n_0^2)^{1/2}/n_1)<1 \quad (3)$$

where $\beta=\sin^{-1}((n_2/n_1)\cos\theta_2)$, $\theta_1$ is the angle formed by the main inclined plane and the optical axis of the pre-bending main waveguide core, $\theta_2$ is the angle formed by the sub-inclined plane and the optical axis of the sub-waveguide core, $n_1$ is the refractive index of the main waveguide core, $n_2$ is the refractive index of the sub-waveguide core, and $n_0$ is the refractive index of the cladding portion.

In the bidirectional communication optical waveguide of the invention, it is possible that the angle $\theta_1$ formed between the main inclined plane and the optical axis of the pre-bending main waveguide core is not more than the angle $\theta_2$ formed between the sub-inclined plane and the optical axis of the sub-waveguide core.

In the bidirectional communication optical waveguide of the invention, it is possible that the optical axis of the pre-bending main waveguide core and the optical axis of the sub-waveguide core intersect each other.

In the bidirectional communication optical waveguide of the invention, it is possible that the optical axis of the pre-bending main waveguide core and the optical axis of the sub-waveguide core are parallel to each other, and the inclined angle of the sub-inclined plane is larger than the inclined angle of the main inclined plane.

In the bidirectional communication optical waveguide of the invention, it is possible that the refractive index $n_1$ of the main waveguide core is substantially equal to the refractive index $n_2$ of the sub-waveguide core.

In the bidirectional communication optical waveguide of the invention, it is possible that the numerical aperture NA1 of the main waveguide core has a value within ±0.5 with respect to the numerical aperture NAf of the optical fiber.

In the bidirectional communication optical waveguide of the invention, the main waveguide core and the sub-waveguide core are brought close to each other at the bent portion, the main inclined plane and the sub-inclined plane face each other at constant intervals, and the following expression (4) is satisfied:

$$0.1D_1 \leq D_c \leq D_1 \quad (4)$$

where $D_c$ is the distance between the main inclined plane and the sub-inclined plane and $D_1$ is the width of the main waveguide core.

In the bidirectional communication optical waveguide of the invention, it is possible that the following expression (5) is satisfied:

$$0.1D_1 \leq D_2 \leq D_1 \quad (5)$$

where $D_1$ is the width of the main waveguide core and $D_2$ is the width of the sub-waveguide core.

In the bidirectional communication optical waveguide of the invention, it is possible that the main inclined plane and the optical axis of the sub-waveguide core intersect each other at the position located within ±0.5 $D_1$ from the intersection point between the main inclined plane and the optical axis of the pre-bending main waveguide core.

In the bidirectional communication optical waveguide of the invention, the optical waveguide has a monitor waveguide core that has the monitor waveguide core end portion, which is connected to the monitor light receiving device while continuously connected to the sub-waveguide core, and the monitor waveguide core for guiding a part of the output light beam to the monitor waveguide core end portion may be further provided.

In the bidirectional communication optical waveguide of the invention, it is possible that the monitor waveguide core is continuously provided to the leading end portion of the sub-waveguide core.

In the bidirectional communication optical waveguide of the invention, it is possible that the following expression (6) is satisfied:

$$0.1D_2 \leq D_m \leq D_2 \quad (6)$$

where $D_m$ is the width of the monitor waveguide core and $D_2$ is the width of the sub-waveguide core.

In the bidirectional communication optical waveguide manufacturing method of the invention, in the mold, the resin discharging end of the recess portion corresponding to the sub-waveguide core is provided at the leading end on the side of the recess portion corresponding to the main waveguide core, the recess portion corresponding to the linear communication passage is formed from the resin discharging end to the through-hole, and α can be set in the range shown by the following expression (7):

$$\theta_2 < \alpha \leq \pi/2 (\text{rad}) \quad (7)$$

where α is the angle formed by the recess portion corresponding to the linear communication passage and the recess portion corresponding to the sub-waveguide core.

In the bidirectional communication optical waveguide manufacturing method of the invention, in the mold, it is possible that the resin discharging end of the recess portion corresponding to the sub-waveguide core is provided at the leading end on the side of the recess portion corresponding to the monitor waveguide core.

According to the bidirectional communication optical waveguide of the invention, since the optical waveguide of the invention can be applied to any communication module in which the light emitting device and the light receiving device are connected to each other at the same frequency, the optical waveguide of the invention has the excellent extensibility and the cost reduction can be achieved. The additional components such as the wavelength selection filter and the half mirror are not required, and the feedback light to the light emitting device can be minimized to perform the bidirectional transmission and reception in the stable light-emitting state.

Since the output of the light emitting device can be monitored to perform the feedback by providing the monitor waveguide in the bidirectional communication optical waveguide, the stable light output can be obtained even if the external conditions such as temperature and humidity are changed.

According to the bidirectional communication optical waveguide manufacturing method of the invention, since excessive labor hour is not required for the optical waveguide producing process, not only the cost reduction can be achieved but also the high-quality optical waveguide can easily be manufactured.

What is claimed is:

1. A bidirectional communication optical waveguide comprising:

a main waveguide core which has a bent portion in a midway in an optical waveguide direction, and which is provided with a main inclined plane forming a constant inclined angle with an optical axis of a pre-bending main waveguide core at the bent portion; and a sub-waveguide core which is provided with a sub-inclined plane in one end portion thereof, the sub-inclined plane being substantially parallel to the main inclined plane, the sub-waveguide core being brought close to the main waveguide core at the bent portion while the sub-inclined plane and the main inclined plane face each other, wherein the main waveguide core has a pre-bending main waveguide core end portion and a post-bending main waveguide core end portion, the pre-bending main waveguide core end portion inputting and outputting a bidirectional light signal from and to an optical fiber, the post-bending main waveguide core end portion being connected to a light receiving device, and the main waveguide core has a structure in which an input light beam from the pre-bending main waveguide core end portion is deflected by total reflection at the main inclined plane and guided to the post-bending main waveguide core end portion, and the sub-waveguide core has a sub-waveguide core end portion on an opposite side to the side on which the sub-waveguide core is brought close to the main waveguide core, the sub-waveguide core end portion being connected to a light emitting device, and the sub-waveguide core has a structure in which a refractive index of the sub-waveguide core is set not more than a refractive index of the main waveguide core and thereby total transmission of an output light beam from the light emitting device is performed through the sub-inclined plane to cause the output light beam to propagate to the main waveguide core, wherein the main waveguide core and the sub-waveguide core are brought close to each other at the bent portion, and the main inclined plane and the sub-inclined plane face each other with a cladding portion therebetween, and the following expressions (1), (2), and (3) are satisfied:

$$\sin \theta_1/((n_1^2-n_0^2)^{1/2}/n_1)<1 \qquad (1)$$

$$\sin \theta_2/((n_2^2-n_0^2)^{1/2}/n_1)>1 \qquad (2)$$

$$\sin(\beta-\theta_1)/((n_1^2-n_0^2)^{1/2}/n_1)<1 \qquad (3)$$

where $\beta=\sin^{-1}((n_2/n_1)\cos\theta_2)$, $\theta_1$ is an angle formed by the main inclined plane and an optical axis of the pre-bending main waveguide core, $\theta_2$ is an angle formed by the sub-inclined plane and the optical axis of the sub-waveguide core, n1 is the refractive index of the main waveguide core, $n_2$ is the refractive index of the sub-waveguide core, and $n_0$ is the refractive index of the cladding portion.

2. The bidirectional communication optical waveguide of claim 1, wherein the angle $\theta_1$ formed between the main inclined plane and the optical axis of the pre-bending main waveguide core is not more than the angle $\theta_2$ formed between the sub-inclined plane and the optical axis of the sub-waveguide core.

3. The bidirectional communication optical waveguide of claim 2, wherein the optical axis of the pre-bending main waveguide core and the optical axis of the sub-waveguide core intersect each other.

4. The bidirectional communication optical waveguide of claim 2, wherein the optical axis of the pre-bending main waveguide core and the optical axis of the sub-waveguide core are parallel to each other, and the inclined angle of the sub-inclined plane is larger than the inclined angle of the main inclined plane.

5. The bidirectional communication optical waveguide of claim 2, wherein the refractive index $n_1$ of the main waveguide core is substantially equal to the refractive index $n_2$ of the sub-waveguide core.

6. The bidirectional communication optical waveguide of claim 1, wherein the numerical aperture NA1 of the main waveguide core has a value within ±0.5 with respect to the numerical aperture NAf of the optical fiber.

7. The bidirectional communication optical waveguide of claim 1, wherein the main waveguide core and the sub-waveguide core are brought close to each other at the bent portion, and the main inclined plane and the sub-inclined plane face each other with a constant interval therebetween, and the following expression (4) is satisfied:

$$0.1D_1 \leq D_c \leq D_1 \qquad (4)$$

where $D_c$ is a distance between the main inclined plane and the sub-inclined plane and $D_1$ is a width of the main waveguide core.

8. The bidirectional communication optical waveguide according to claim 1, wherein the following expression (5) is satisfied:

$$0.1D_1 \leq D_2 \leq D_1 \qquad (5)$$

where $D_1$ is the width of the main waveguide core and $D_2$ is a width of the sub-waveguide core.

9. The bidirectional communication optical waveguide of claim 1, wherein the main inclined plane and the optical axis of the sub-waveguide core intersect each other at a position located within ±0.5$D_1$ from an intersection point between the main inclined plane and the optical axis of the pre-bending main waveguide core, where D1 is the width of the main waveguide core.

10. The bidirectional communication optical waveguide of claim 1, further comprising a monitor waveguide core that has a monitor waveguide core end portion which is connected to a monitor light receiving device while continuously connected to the sub-waveguide core, and which guides a part of the output light beam to the monitor waveguide core end portion.

11. The bidirectional communication optical waveguide of claim 10, wherein the monitor waveguide core is continuously provided to a leading end portion of the sub-waveguide core.

12. The bidirectional communication optical waveguide of claim 10, wherein the following expression (6) is satisfied:

$$0.1D_2 \leq D_m \leq D_2 \quad (6)$$

where $D_m$ is a width of the monitor waveguide core and $D_2$ is a width of the sub-waveguide core.

13. A method for manufacturing the bidirectional communication optical waveguide of claim 1, at least comprising:
   1) preparing a mold which is formed from a curable resin layer made of a mold forming curable resin, and which is provided with recess portions and through-holes at least in a thickness direction, the recess portions corresponding to a main waveguide core and a sub-waveguide core, the through-holes being coupled to resin intruding ends and a resin discharging end of the recess portions, respectively;
   2) bringing a cladding substrate in close contact with the mold, the cladding substrate having good adhesion properties to the mold;
   3) filling the through-holes with core forming curable resin, and bringing the core forming curable resin in contact with the resin intruding ends to cause the core forming curable resin to enter the recess portions corresponding to the main waveguide core and the sub-waveguide core, the through-holes being coupled to the resin intruding ends of the recess portions corresponding to the main waveguide core and the sub-waveguide core; and
   4) curing the core forming curable resin that has entered.

14. The bidirectional communication optical waveguide manufacturing method of claim 13, wherein, in the mold, the resin discharging end of the recess portion corresponding to the sub-waveguide core is provided at a leading end on the side of the recess portion corresponding to the main waveguide core, a recess portion corresponding to a linear communication passage is formed from the resin discharging end to the through-hole, and α can be set in the range shown by the following expression (7):

$$\theta_2 < \alpha \leq \pi/2 \text{(rad)} \quad (7)$$

where α is an angle formed by the recess portion corresponding to the linear communication passage and the recess portion corresponding to the sub-waveguide core.

15. A method for manufacturing the bidirectional communication optical waveguide of claim 1, at least comprising:
   1) preparing a mold which is formed from a curable resin layer made of a mold forming curable resin, and which is provided with recess portions and through-holes at least in a thickness direction, the recess portions corresponding to a main waveguide core, a sub-waveguide core, and a monitor waveguide core, the through-holes being coupled to a resin intruding end and a resin discharging end of the recess portions, respectively;
   2) bringing a cladding substrate in close contact with the mold, the cladding substrate having good adhesion properties to the mold;
   3) filling the through-holes with core forming curable resins, and bringing the core forming curable resins in contact with the resin intruding ends to cause the core forming curable resin to enter the recess portions corresponding to the main waveguide core, the sub-waveguide core, and the monitor waveguide core, the through-holes being coupled to the resin intruding ends of the recess portions corresponding to the main waveguide core, the sub-waveguide core, and the monitor waveguide core; and
   4) curing the core forming curable resin that has entered.

16. The bidirectional communication optical waveguide manufacturing method of claim 15, wherein, in the mold, the resin discharging end of the recess portion corresponding to the sub-waveguide core is provided at a leading end on the side of the recess portion corresponding to the monitor waveguide core.

* * * * *